(12) United States Patent
Boffi et al.

(10) Patent No.: US 6,292,280 B1
(45) Date of Patent: Sep. 18, 2001

(54) OPTICAL DEVICE AND A METHOD OF PROCESSING A DIGITAL OPTICAL SIGNAL IN PARALLEL AND IN FREE SPACE

(75) Inventors: Pierpaolo Boffi, Voghera; Mario Martinelli, S. Donato Milanese; Diego Mottarella, Milan; Davide Piccinin, S. Giuletta, all of (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/096,387

(22) Filed: Jun. 12, 1998

Related U.S. Application Data
(60) Provisional application No. 60/050,358, filed on Jun. 20, 1997.

(30) Foreign Application Priority Data

Jun. 19, 1997 (EP) .................................................. 97201876

(51) Int. Cl.[7] .................................................. G06E 1/00
(52) U.S. Cl. ........................................... 359/107; 359/108
(58) Field of Search .................................... 359/107, 108, 359/123, 127; 708/191, 816, 831

(56) References Cited

U.S. PATENT DOCUMENTS 5,589,967 * 12/1996 Auffret ................................. 359/123

FOREIGN PATENT DOCUMENTS 0 385 430 A 9/1990 (EP) .

OTHER PUBLICATIONS

Boffi, "Optical time–to–space converter", Optics Communications, pp. 473–476, Feb. 1996.*

Boffi et al.; "Optical Time–to–Space Converter", Optics Communications, vol. 123, No. 4/6, Feb. 1, 1996, pp. 473–476.

Escobar; "All–Optical Switching Systems Near Practical Use", Laser Focus World, vol. 30, No. 10, Oct. 1, 1994, pp. 135–141.

Noguchi et al.; "A Rearrangeable Multichannel Free–Space Optical Switch Based on Multistage Network Configuration", Journal of Lightwave Technology, vol. 9, No. 12, Dec. 1, 1991, pp. 1726–1732.

Boffi et al.; "Photonic Sampler for 1550–nm Signals", Optics Letters, vol. 20, No. 6, Mar. 15, 1995, pp. 641–643.

Tsukada et al.; "40 Gbit/s Optical Time–Division Cell Multiplexer for a Photonic ATM Switch", Electronics Letters, vol. 26, No. 22, Oct. 25, 1990, pp. 1895–1897.

* cited by examiner

*Primary Examiner*—Cassandra Spyrou
*Assistant Examiner*—Leo Boutsikaris
(74) *Attorney, Agent, or Firm*—Finnegan, Henderson, Farabow, Garrett & Dunner, L.L.P.

(57) ABSTRACT

An optical device is provided for processing a digital optical signal in parallel and in free space. A device consistent with the invention provides for inputting a digital optical signal in guided propagation, converting the digital optical signal to n digital optical signals in guided propagation, and converting the n digital optical signals to n digital optical signals in free space. In addition, the invention provides for selecting a bit preselected from the at least one temporal series of n bits of each of the n digital optical signals, modifying optically, at least one bit of the spatial figure of the n bits, and outputting the at least one bit of the spatial figure of n bits.

39 Claims, 13 Drawing Sheets a)

b)

OPTICAL DEVICE AND A METHOD OF PROCESSING A DIGITAL OPTICAL SIGNAL IN PARALLEL AND IN FREE SPACE

This application is based on European Patent Application No. 97201876.6 filed on Jun. 19, 1997 and U.S. Provisional Application No. 60/050,358 filed on Jun. 20, 1997, the content of which is incorporated hereinto by reference.

The present invention relates to an optical device and a method of processing a digital optical signal in parallel and in free space.

Further to the widespread development of optical communication systems, the need is felt for devices capable of performing, at high speed, various operations on those bits which constitute the digital information of an optical signal and of creating advanced "super computers" and network nodes suitable for modern methods of information transfer (e.g. ATM).

The equipment currently used for processing optical signals is inadequate to manage the ever increasing transmission speeds possible in transmission systems of optical fibre type. In fact, such equipment consists of digital electronic devices with a limited band in comparison with the optical band available in optical fibre transmission systems based on serial information processing.

Furthermore, the equipment which enables the signal to be maintained in optical form, e.g. intensity or phase modulators, processes signals under the control of an electrical signal and suffers from the inherent limitations of electronic devices.

Consequently, there is still a great need to obtain the full benefit of the optical band available in optical fibre transmission systems, processing the signal by means of purely optical control signals and thus overcoming the inherent limitations of electronic devices.

U.S. Pat. No. 5,589,967 describes a method and a device for transmitting and switching packets in an optical network which carries out multiplexing by a synchronous time division system, in which the packets are transmitted at a given speed and the transmission rate is determined by line occupancy time.

Patent EP 0 742 660 A1 describes a signal processor for processing digital signals in the physical domain (e.g. optical). A symbol flow is conducted towards different delay branches. The number of delay branches is such that at any given time, in at least one of the branches, a "1" symbol and a "0" symbol are available. By controlling the opening and closing of the on/off switches, the symbol values can be changed. Furthermore, extra light sources are not necessary and the processor is transparent, that is the processor output symbols possess exactly the same physical characteristics as the processor input symbols. Processing of the optical signals takes place in a serial way and in guided propagation.

Boffi P. et al. ["Optical time-to-space converter", Optics Communications, 123, 473–476 (1996)] describe an all-optical time-to-space converter of free propagation type which translates time-coded binary words of an optical communication signal of 1550 nm to equivalent space-coded words. Conversion is carried out by means of four optical gates, one for each of the four polarized optical signals. Each optical gate comprises a first and second indium-doped cadmium tellurium crystal (CdTe:In). There are two optical control beams, one for the first four and one for the second four crystals. In the right-hand column of page 476, lines 10–12, the authors wish that it might be possible for this time-to-space converter to constitute the input stage of an all-optical optic signal processor in free space, but do not indicate what means could be used to construct such a processor.

The present invention is designed for creation of such means and such a processor.

A first object of the present invention is therefore an optical device for processing a digital optical signal in parallel and in free space, the said device comprising:

a) means of input in guided propagation of a digital optical signal comprising at least one temporal series of n bits;

b) means capable of converting the said digital optical signal to a beam of n signals in guided propagation, each of the same comprising at least one temporal series of n bits;

c) means capable of converting the said beam of n digital optical signals in guided propagation, each of the same comprising at least one temporal series of n bits, to a beam of n digital optical signals in free space;

d) means capable of selecting, in parallel and in free space, a bit pre-selected from the said at least one temporal series of n bits of each of the said n digital optical signals, so as to transform the said at least one temporal series of n bits into a spatial figure of the said n bits carrying the same information as that previously contained in the said at least one temporal series, characterised in that the said device also comprises e) optical means capable of modifying, in parallel and in free space, at least one bit of the said spatial figure of the said n bits, the said means being selected by the group consisting of means capable of eliminating at least one bit, means capable of inserting at least one bit and means capable of modifying the form of at least one bit, and f) means of output of the said at least one bit of the said spatial figure of n bits.

Throughout the present description and of the following claims, the expression "propagation in free space" is used to indicate all the modes of propagation of an optical signal which, in a device according to the present invention, are not guided by an optical fibre.

Typically, the said means capable of converting the said digital optical signal to a beam of n digital optical signals in guided propagation, each of the same comprising at least one temporal series of n bits, comprise:

a) means of cloning the said digital optical signal in the said n digital optical signals in guided propagation;

b) first n lines capable of interval-timing the said digital optical signals in guided propagation according to predetermined time intervals;

c) means of controlling and, if necessary, changing the state of polarization of the said n digital optical signals in guided propagation.

Preferably, the said means capable of converting the said beam of n digital optical signals in guided propagation to a beam of n digital optical signals in free space comprise means of collimation capable of guiding the said n digital optical signals in free space in a predetermined direction and maintaining them within predetermined transverse dimensions.

Typically, the said means capable of selecting, in parallel and in free space, a bit pre-selected from the said at least one temporal series of n bits of each of the said n digital optical signals, so as to transform the said at least one temporal series of n bits into a spatial figure of the said n bits carrying the same information as that previously contained in the said at least one temporal series comprises:

a) a first optical switching module;
b) a second optical switching module arranged in series in relation to the said first optical switching module;
c) means of supplying to the said first and, respectively, to the said second optical switching modules a pair of a first and a second beam of optical control pulses having a predetermined time interval between each other.
d) a dichroic mirror capable of guiding the said at least one pair of a first and a second beam of optical control pulses in collinear form in relation to the propagation direction of the said n digital optical signals.
e) means of collimation to guide the said at least one pair of a first and second beam of optical control pulses in free space in such a way that they are incident upon the said dichroic mirror at a pre-fixed angle.

Preferably the said first and second optical switching modules comprise, respectively, a first and second element, capable of causing the plane of polarization of the said n digital optical signals in free space to rotate by a predetermined angle under the action of the said at least one pair of a first and a second beam of optical control pulses, and they also comprise, respectively, a first and a second polarization analyzer capable of filtering, along a predetermined plane of polarization, the said n digital optical signals output from the said first and, respectively, second elements.

The said first and second elements preferably consist of a first and a second indium-doped cadmium tellurium monocrystal (CdTe:In).

Typically, the said first and second polarization analyzers are oriented essentially orthogonal to each other.

Typically, the said means of output comprise optical focusing means capable of guiding the said spatial figure of n bits in free space in means of guided propagation.

Preferably the said means of output also comprise second n lines capable of interval-timing the said n bits of the said spatial figure according to predetermined time intervals.

More preferably, the said means of output also comprise means capable of conveying the said interval-timed n bits and in guided propagation to a processed digital optical signal comprising at least one temporal series of n bits.

Typically, the means of eliminating the said at least one bit of the said spatial figure of n bits comprise a third switching module and means of supplying at least one optical elimination signal.

Preferably the said third switching module comprises an element capable of causing the plane of polarization of at least one of the said n digital optical signals, output from the said first n interval-timing lines and the said means of collimation, to rotate by a predetermined angle, under the action of the said at least one optical elimination signal, and also comprises a polarization analyzer capable of filtering, along a predetermined plane of polarization, the said n digital optical signals output from the said element.

More preferably, the said element consists of an indium-doped cadmium tellurium monocrystal (CdTe:In).

According to a preferred solution, the said at least one optical elimination signal is co-linear to and overlaps a single one of the said n digital optical signals output from the said first n interval-timing lines.

In a preferred design form, the electrical field is applied perpendicular to face 1100 of the said crystal whilst the signal and the control beam are applied perpendicular to face 1900.

Preferably the said means of elimination of the said at least one bit of the said spatial figure of n bits also comprise, downstream of the said third switching module, means transparent to the wavelength of the said n digital optical signals and capable of reflecting the wavelength of the said at least one optical elimination signal.

Typically, the means capable of inserting at least one bit into the said spatial figure of n bits comprise means of supplying at least one optical insertion signal to the said first and second optical switching modules.

Preferably, the said at least one optical insertion signal possesses the same wavelength and power as the optical signals constituting the said spatial figure of n bits.

Furthermore, the said means of supplying the said at least one optical insertion signal also comprise
means transparent to half the power of the said n digital optical signals and of the said at least one optical insertion signal and
means capable of reflecting the other half of the power.

Typical examples of the said transparent means comprise a 50/50 optical beam splitter.

Preferably the said 50/50 optical beam splitter is essentially inclined 45° in relation to the direction of the said n digital optical signals and the said at least one optical insertion signal, the direction of the said digital optical signals being essentially orthogonal to the direction of the said at least one optical insertion signal.

More preferably, the said means of supplying at least one optical insertion signal also comprise means capable of collimating in free space the said at least one optical insertion signal so that it is incident upon the said 50/50 beam splitter at an angle of approximately 45° and so that it overlaps one of the said n digital optical signals.

Typically the said means of supplying the said at least one optical insertion signal also comprise means of controlling and, if necessary, of varying the state of polarization thereof.

Preferably the means of modifying the form of the said at least one bit of the said spatial figure of n bits comprise means capable of varying the said time interval between the said first and second beam of optical control pulses of the said at least one pair of a first and a second beam of optical control pulses.

According to an embodiment, the said second n lines interval-time at least one bit of the said spatial figure of n bits by a time such that in output the said at least one bit is delayed, in relation to the other bits of the said spatial figure of n bits, by a different time quantity from that of the said bit in output from the said input means.

According to a variant, the said optical means capable of modifying, in parallel and in free space, at least one bit of the said spatial figure of n bits also comprise means capable of executing algebraic operations on the said spatial figure of n bits.

According to another variant, the said optical means capable of modifying, in parallel and in free space, at least one bit of the said spatial figure of n bits also comprises means capable of executing symmetry operations on the said spatial figure of n bits.

Preferably the said means capable of executing the said algebraic operations comprise at least one element capable of causing the plane of polarization of the said n bit(s) of the said spatial figure, output from the said first and second optical switching modules, to rotate by a predetermined angle, under the action of an optical beam enabling the said algebraic operations.

More preferably, the said mean capable of executing the said algebraic operations also comprise at least one means transparent to a first predetermined plane of polarization of the said n bits of the said spatial figure, the said transparent means also being capable of deviating a second plane of polarization essentially orthogonal to the said first plane.

Again more preferably, the said means capable of executing the said algebraic operations also comprise at least one mirror capable of reflecting the said n bits of the said spatial figure.

Typically the said means capable of executing the said symmetry operations comprise at least one element capable of causing the plane of polarization of the said n bits of the said spatial figure, output from the said first and second optical switching modules, to rotate by a predetermined angle under the action of an optical beam enabling the said symmetry operations.

Furthermore, the said means capable of executing the said symmetry operations also comprise at least one means transparent to one first predetermined plane of polarization of the said n bits of the said spatial figure, the said transparent means also being capable of deviating a second plane of polarization essentially orthogonal to the said first plane.

Moreover, the said means capable of executing the said symmetry operations also comprise means capable of reflecting the said n bits of the said spatial figure.

Preferably the said means capable of executing the said symmetry operations also comprise means capable of varying the state of polarization of the said n bits of the said spatial figure.

A method of processing a digital optical signal in parallel and in free space constitutes a second object of the present invention, the said method comprising:

a) feeding of a digital optical signal comprising at least one temporal series of n bits;

b) conversion of the said digital optical signal to a beam of n digital optical signals in guided propagation, each of the said signals comprising at least one temporal series of n bits;

c) conversion of the said beam of n digital optical signals in guided propagation, each of the said signals comprising at least one temporal series of n bits, to a beam of n digital optical signals in free space;

d) selection, in parallel and in free space, of a bit preselected from the said at least one temporal series of n bits of each of the said n digital optical signals, so as to transform the said at least one temporal series of n bits into a spatial figure of the said n bits carrying the same information as that previously contained in the said at least one temporal series, characterised in that the said method also comprises modification, in parallel and in free space, of at least one bit of the said spatial figure of n bits.

A third object of the present invention consists of a device for modifying the temporal duration of at least one bit of a temporal series of n bits transformed into a corresponding spatial figure of n bits, characterised in that the said n bits of the said spatial figure are guided in a beam of n optical waveguides at the end of which the said n bits are subsequently guided in a single optical waveguide in the form of temporal series of n bits, and in that the said beam of n optical waveguides comprises at least a section of optical waveguide having a length which is selected such that in input to the said single optical waveguide one bit which has passed through the said section is separated from at least one of the other bits of the said time series by a different time interval from that by which it was separated in the initial temporal series.

The special characteristic of the optical device according to the invention consists of the fact that the device enables processing of a digital optical signal, maintaining the said signal in optical form and under the control of optical control signals.

As already stated above, this enables the band limitations of conventional electronic devices and the slow response times of electronically controlled optical devices (e.g. liquid crystal and thermo-optic modulators) to be overcome.

Further advantages of the device according to the present invention consist in the fact that the device enables processing of signals in free space, thus benefiting from the "space" resource offered by optics, as well as processing in parallel, thus enabling a higher speed to be obtained in comparison with the serial type processing typical of conventional electronic processors and optical fibre guiding systems and furthermore in waveguide.

Furthermore, the optical device according to the present invention enables processing of signals having the wavelength typical of optical fibre type transmission systems, e.g. approximately 1300 and 1550 nm.

Characteristics and advantages of the invention are now illustrated with reference to embodiments represented by way of non limiting example, in the appended drawings, in which.

Figure 1:
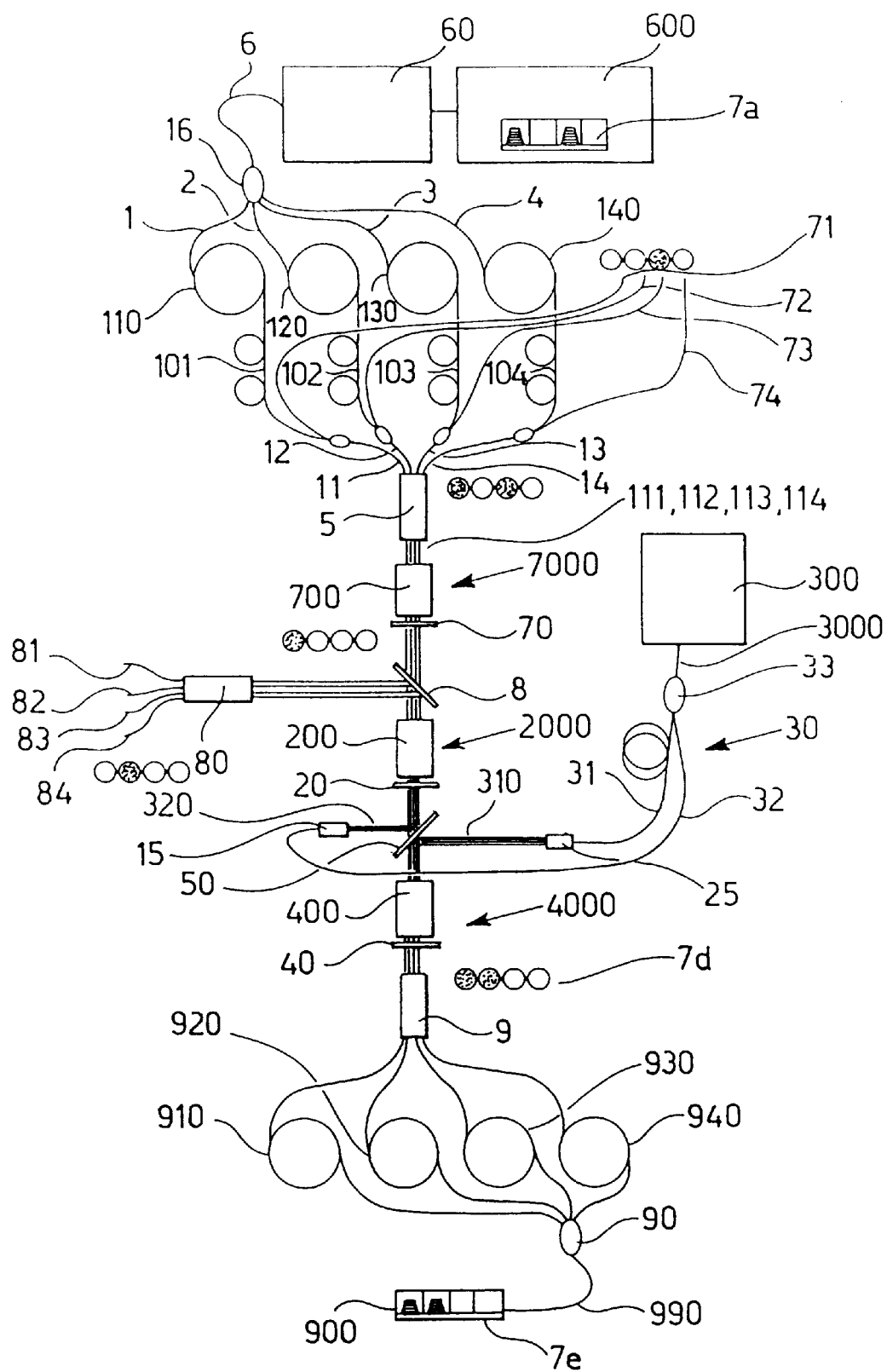
FIG. 1 shows a first embodiment of an optical device according to the invention.
Figure 11A:
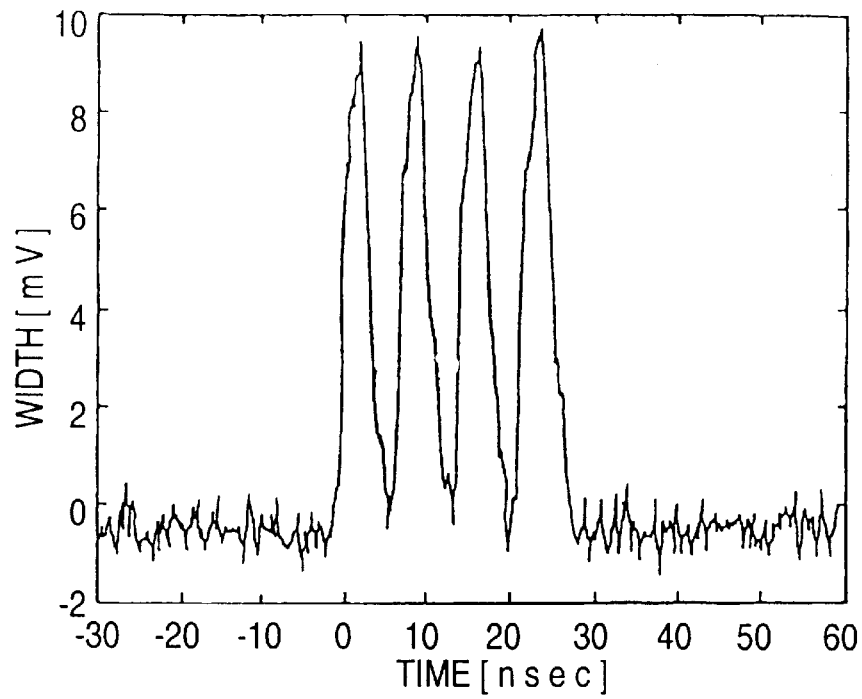
Figure 11B:
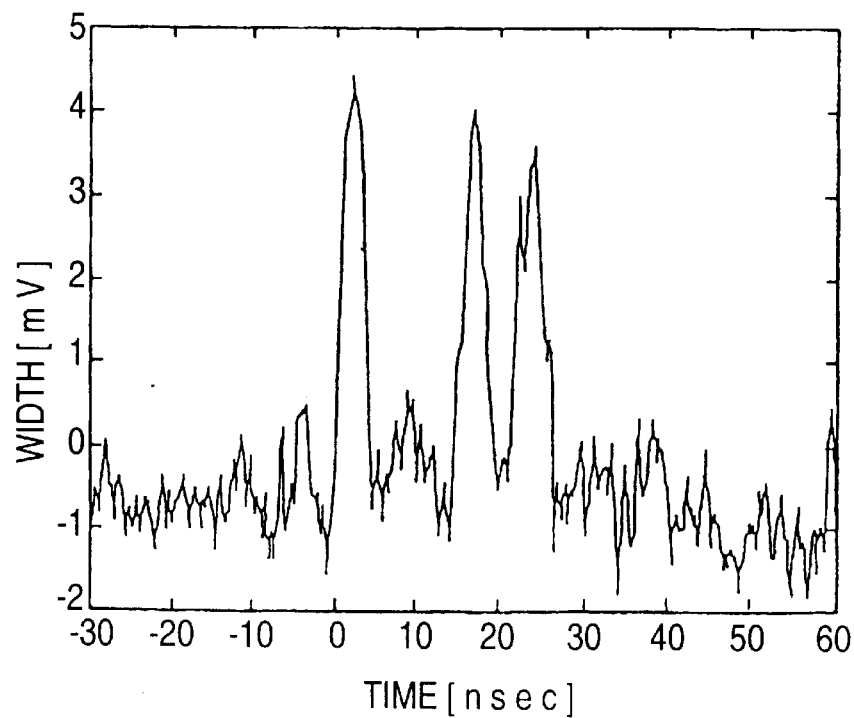
Figure 12A:
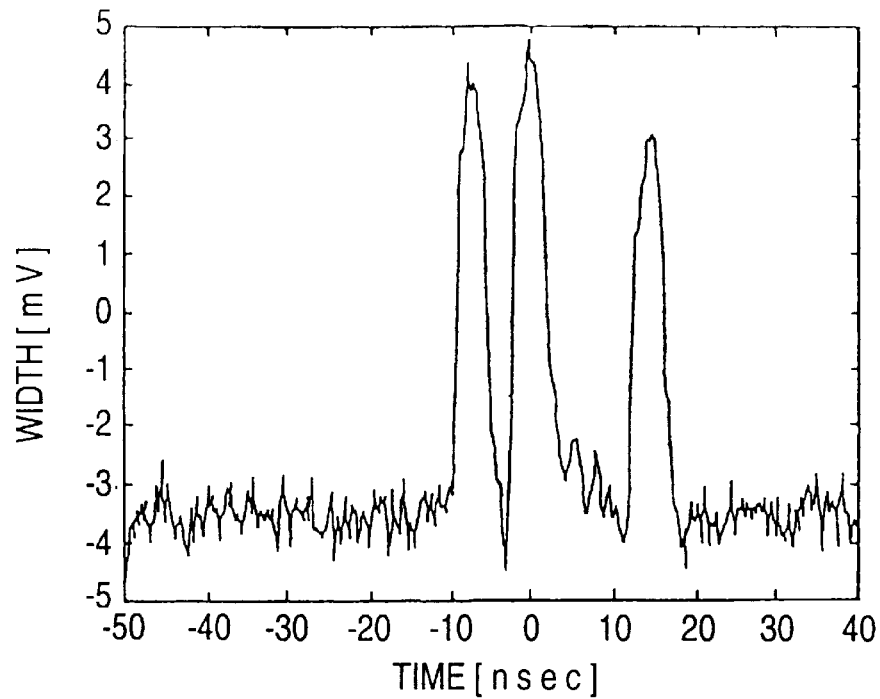
Figure 12B:
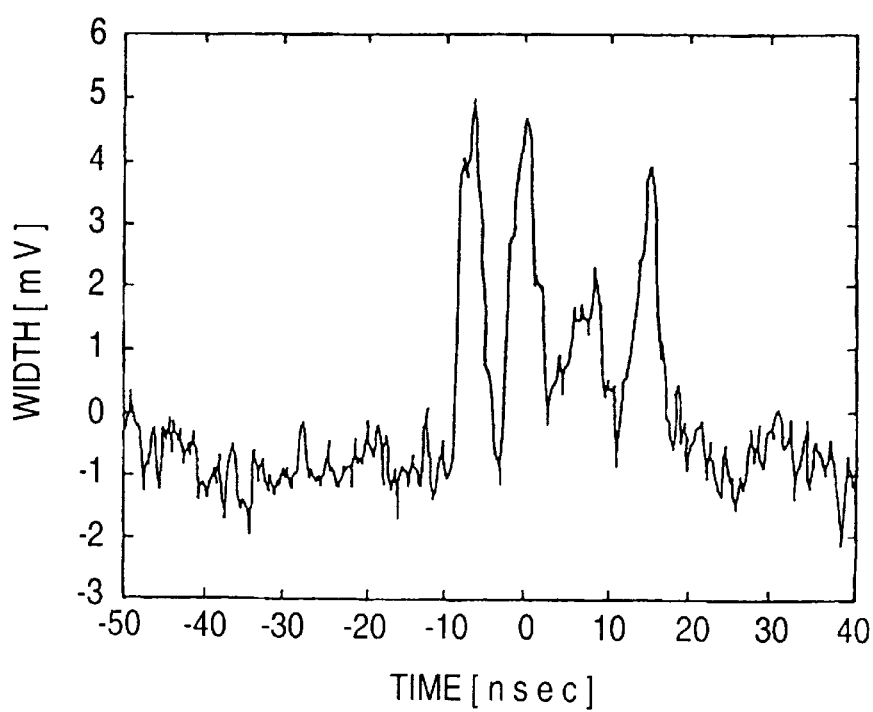
Figure 13A:
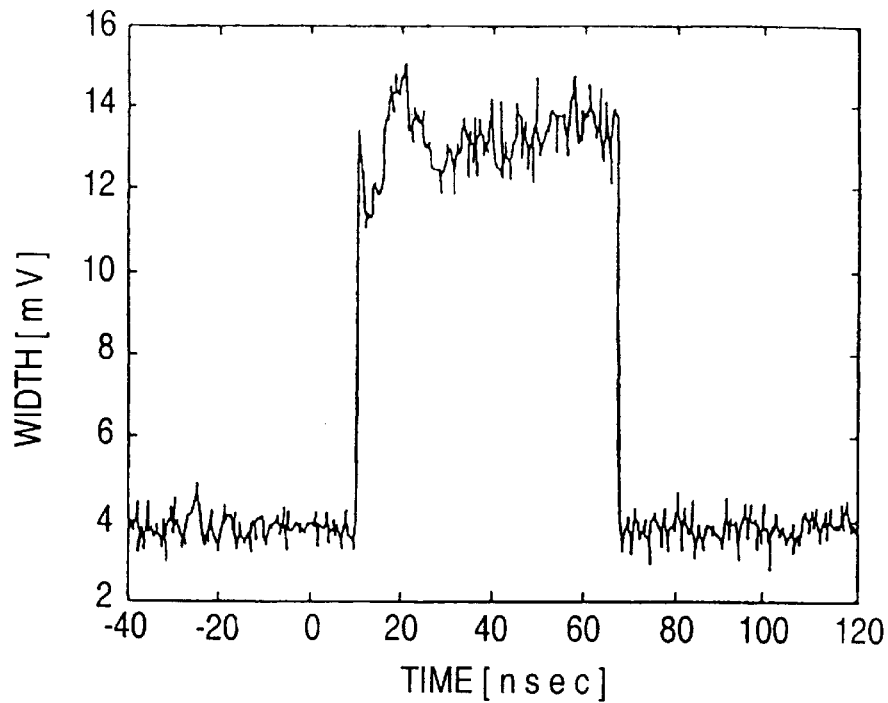
Figure 13B:
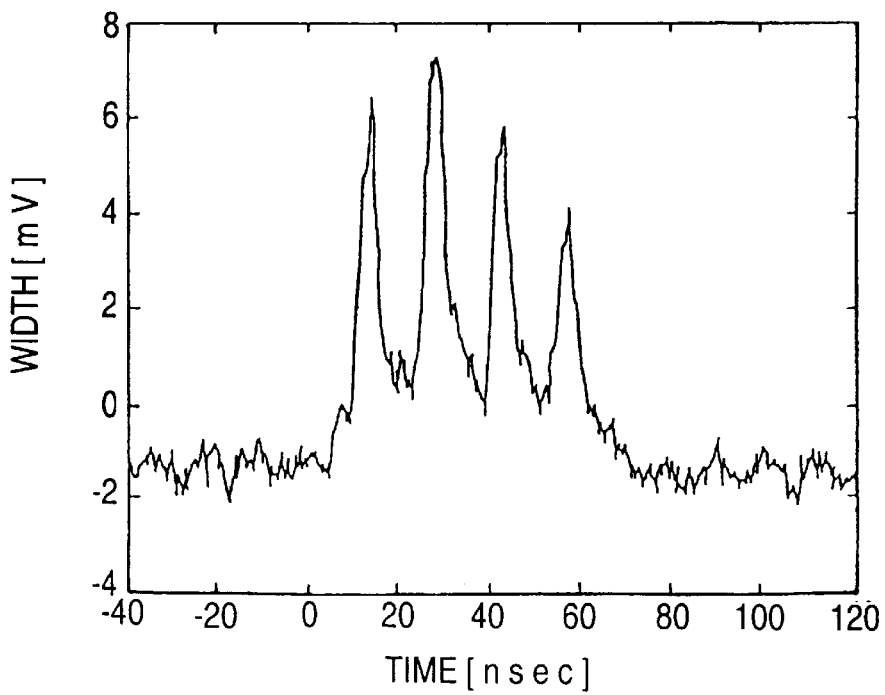
Figure 14A:
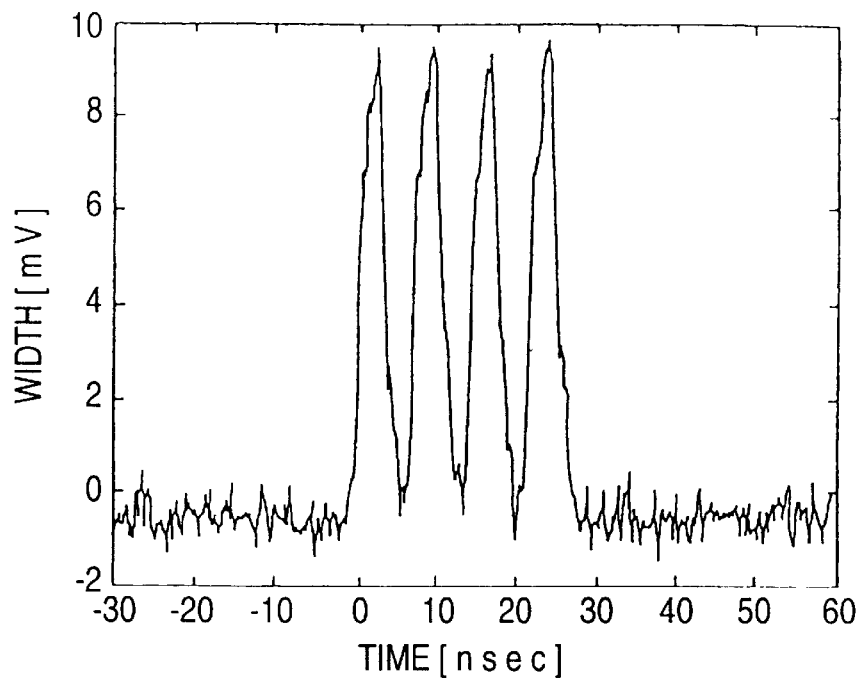
Figure 14B:
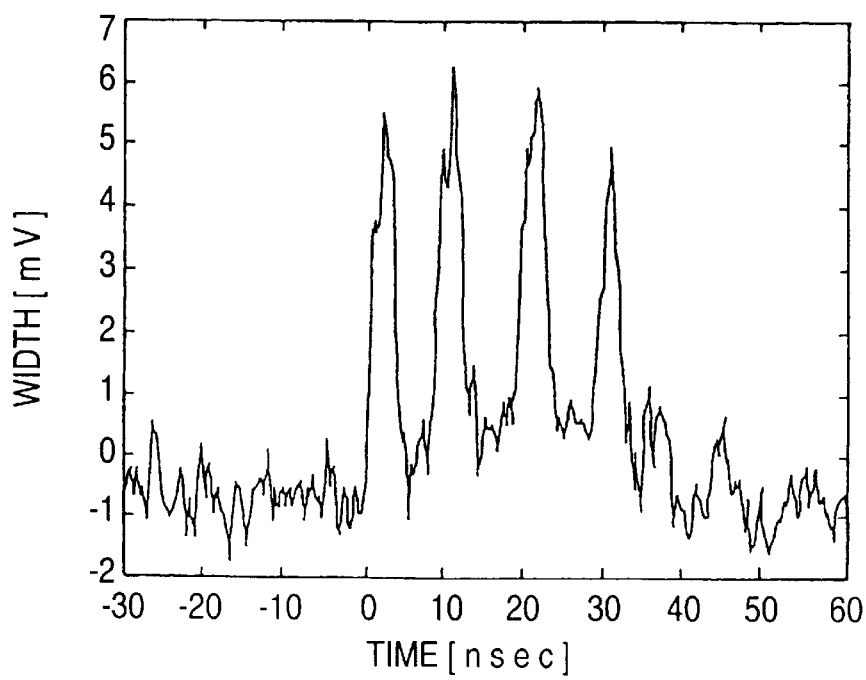

FIGS. 11*a* and 11*b* show a graphic representation of a 4 bit signal in input (FIG. 11*a*) and in output (FIG. 11*b*) following an operation of elimination of one bit in the device as illustrated in FIG. 1;

FIGS. 12*a* and 12*b* show a graphic representation of a 4 bit signal in input (FIG. 12*a*) and in output (FIG. 12*b*) following an operation of insertion of one bit in the device illustrated in FIG. 1;

FIGS. 13*a* and 13*b* show a graphic representation of a 4 bit signal in input (FIG. 13*a*) and in output (FIG. 13*b*) after an operation of modification of the form of four bits in the device illustrated in FIG. 1;

FIGS. 14*a* and 14*b* show a graphic representation of a 4 bit signal in input (FIG. 14*a*) and in output (FIG. 14*b*) following an operation of modification of the bit rate of four bits in the device illustrated in FIG. 1.

The embodiment of FIG. 1 represents an optical device for processing in free space and in parallel four bits of a digital optical signal 6 comprising at least one temporal series 7*a* of four bits.

Means of input, for generating the said optical digital signal 6, comprise a laser 60 with DFB (pigtailed) semiconductor emitting at approximately 1550 nm and modulated by a word generator 600 at a frequency of approximately 140 Mbit/s.

The power of the said digital optical signal 6 output from the said laser 60 is approximately 1 mW. An optical amplifier (not shown in the Figure), e.g. a fibre doped with erbium and having variable gain, enables a power of approximately 15 mW to be obtained in output from the said means of input 60 and 600, so as to compensate any losses from the subsequent stages.

An optical fibre 1×4 coupler 16 clones the said digital optical signal 6 thus amplified so as to obtain four identical copies 1, 2, 3 and 4 of the four bit temporal series 7a.

Four lines (line sections) made of optical fibre 110, 120, 130 and 140 in different lengths delay, in relation to each other, the said four digital optical signals 1, 2, 3 and 4 by multiple quantities of the bit time which, at approximately 149 Mbit/s, is approximately 7.12 ns. Because the speed of the light in the glass is approximately $2\times10^8$ m/s, in order to work a delay of 7.12 ns it is necessary to lengthen the path by 1.428 m. The optical fibre line section 110 from which the first bit is extracted is lengthened by 4.284 m, section 120 corresponding to the second is lengthened by 2.856 m, section 130 corresponding to the third is lengthened by 1.428 m, while the fibre line section 140 relating to the fourth bit is not lengthened. The said optical fibre sections 110, 120, 130 and 140 are wound onto a reel having a sufficiently large diameter so as not to cause losses due to excessive curvature.

Figure 7:
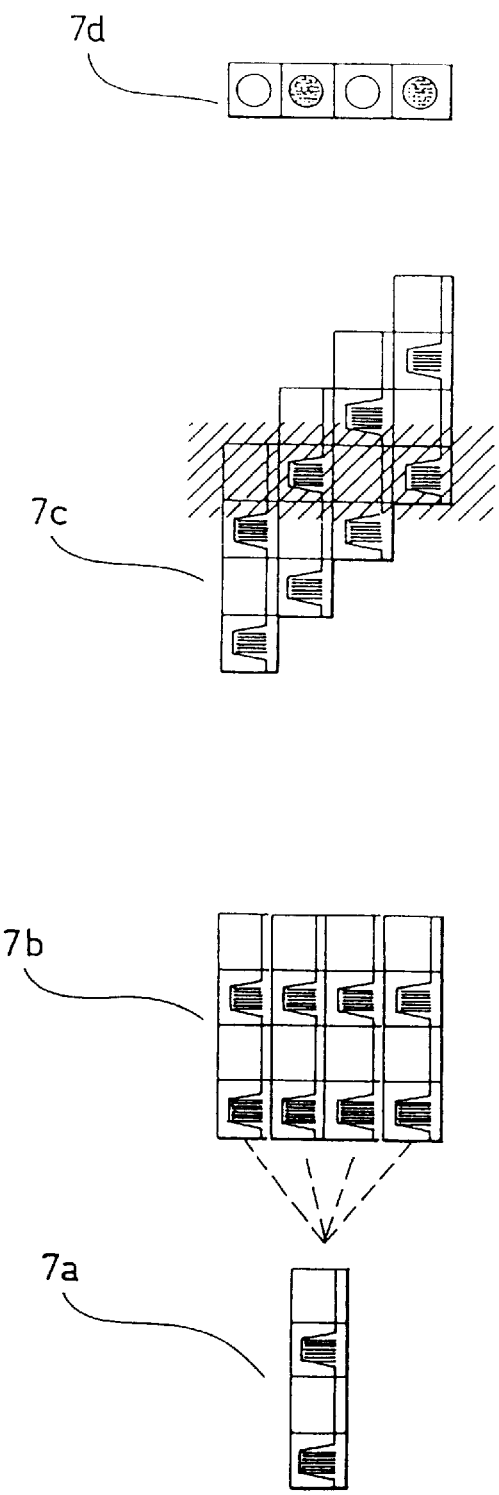
FIG. 7 shows the logic operation diagram of the means illustrated in FIG. 6.

Having thus delayed the first digital optical signal 1 for a time equivalent to three times the bit time, the second digital optical signal 2 for a time equivalent to twice the bit time, the third digital optical signal 3 for a time equivalent to once the bit time and not having delayed the fourth digital optical signal 4, output from the said four optical fibre line sections 110, 120, 130 and 140, are simultaneously found the first, the second, the third and the fourth bit of the said temporal series 7a to be converted, corresponding, respectively, to the said four optical fibre line sections 110, 120, 130 and 140 (FIG. 7).

FIG. 7 illustrates the conversion of a four bit temporal series 7a to a four bit spatial FIG. 7d which carries the same information as 7a. The procedure necessitates:

cloning of the temporal series 7a in four identical temporal series, indicated all together by 7b;

delaying, by means of delay lines 110, 120, 130 and 140, of temporal series 7b, in relation to each other, by a multiple of the bit time, thus creating time-space FIG. 7c;

appropriately selecting, from the time-space FIG. 7c, the FIG. 7d by means of suitable switching modules 2000, 4000.

Figure 6:
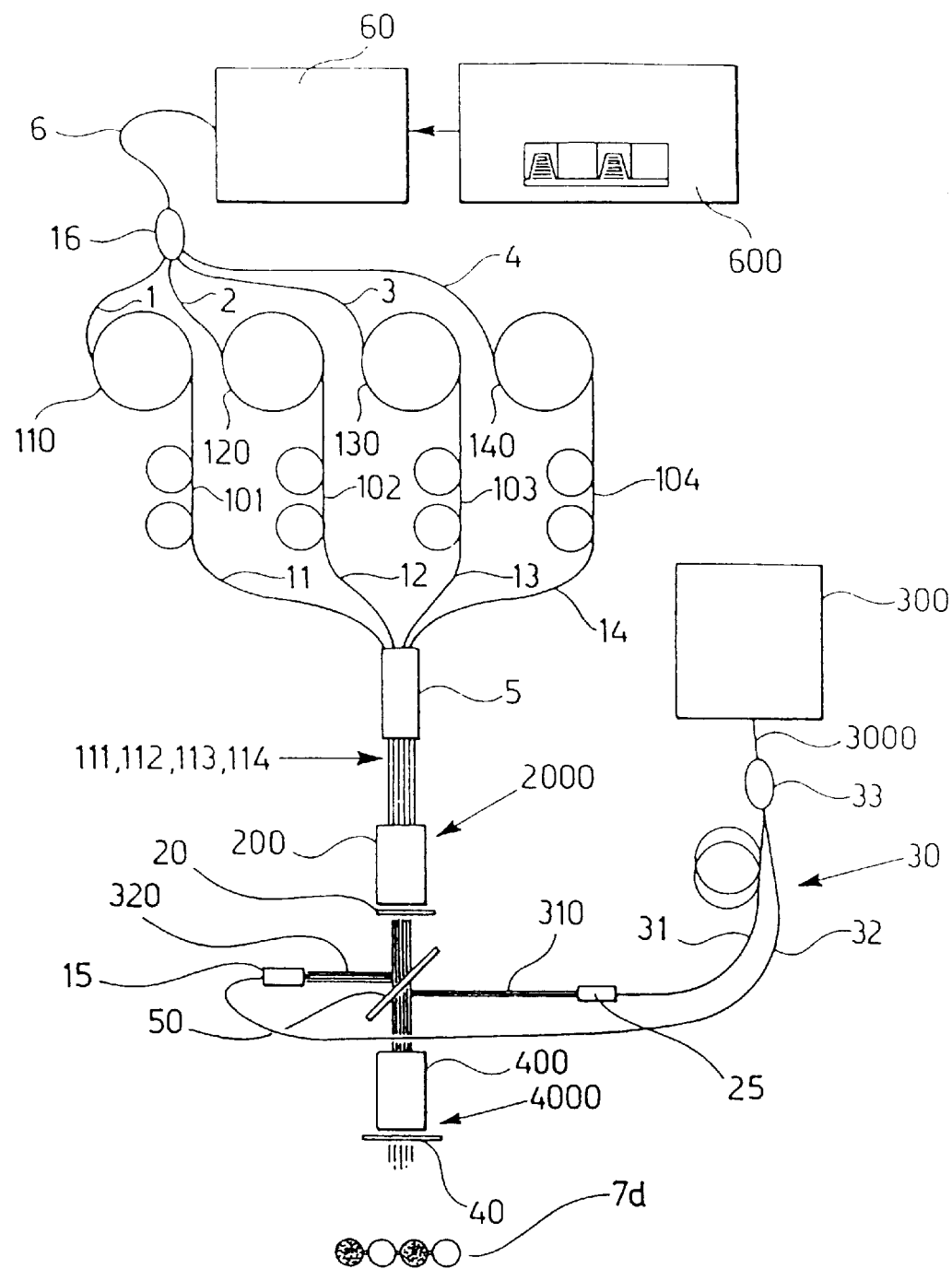
FIG. 6 shows means of the optical device illustrated in FIG. 1 capable of converting a temporal sequence of n bits into a corresponding spatial figure.

As shown in FIG. 6, suitable means 101, 102, 103 and 104 control and, if necessary, vary the state of polarization of the said four digital optical signals 1, 2, 3 and 4 output from the said four optical fibre line sections 110, 120, 130 and 140.

In a preferred embodiment, the said means 101, 102, 103 and 104 of controlling and, as if necessary, varying the state of polarization of the said four signals 1, 2, 3 and 4 consist of four polarization controllers which in turn consist, for example, of four pairs of fibre optic polarization rotators. Preferably each pair of polarization rotators consists of two discs, made, for example, of metal and/or plastic, of suitable diameter, onto which turns of optical fibre coils are wound. The said turns induce a birefringence in the normal plane of the fibre in the direction of propagation of the said signals 1, 2, 3 and 4. By suitably selecting the diameter size of the said coils it is possible to create a $\lambda/4$ plate by one turn of an optical fibre line and a $\lambda/2$ plate by 2 turns. Given that it is possible to obtain any state of polarization whatsoever through rotation of a $\lambda/2$ plate and a $\lambda/4$ plate, using the said means 101, 102, 103 and 104 it is possible to regulate the state of polarization of each of the four signals 1, 2, 3 and 4 with a high degree of accuracy.

Means of collimation 5 located downstream of the said means 101, 102, 103 and 104 capable of controlling and, as the case may be, varying the polarization state of the said signals 1, 2, 3 and 4 act as an interface between an optical fibre line section in guided propagation and a section in free space (approximately 20 cm) in which a first 2000 and a second 4000 switching modules are located.

The said means 5 are capable of converting the said four digital optical signals 1, 2, 3 and 4 in guided propagation to four digital optical signals 111, 112, 113 and 114 in free space. Furthermore, the said means 5 are capable of collimating these latter digital optical signals 111, 112, 113 and 114 for the entire section in free space and maintaining them parallel and within the transversal dimensions of the said first and second optical switching modules 2000 and 4000.

Figure 2:
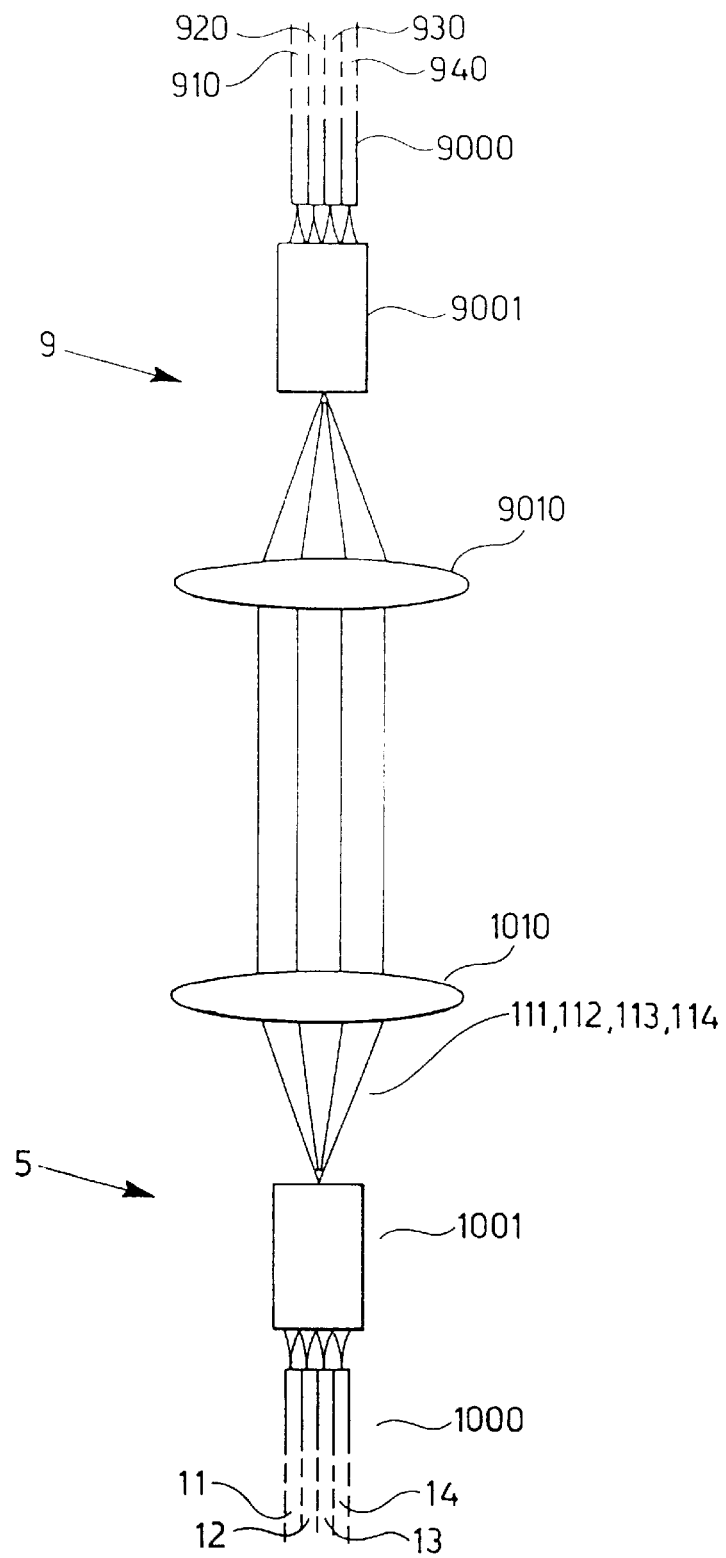
FIG. 2 shows means of collimation and focusing of the device illustrated in FIG. 1.

As shown in FIG. 2, four optical fibres 11, 12, 13 and 14 in output from the said means 101, 102, 103 and 104 capable of controlling and, if necessary, varying the state of polarization are arranged in a linear geometry having essentially the minimum dimensions. Such linear geometry can be obtained by removing the plastic cladding from the said four optical fibres 11, 12, 13 and 14 and gluing the fibres thus uncovered close to each other on a glass mounting.

Because the external diameter of the cladding of the monomode fibres, at 1550 nm, is approximately 125 $\mu$m, the overall dimension of an array of fibres 1000 thus created is approximately 500 $\mu$m. The gap between the extreme outside signals 1 and 4 at output from the said set 1000 is consequently approximately 375 $\mu$m.

A grin-type lens 1001 having a pitch equivalent to, for example, 0.25 collimates the four digital optical signals 111, 112, 113 and 114 output from the said array 1000. The functioning of the grin lens 1001 is based on a radial variation of the index of refraction rather than on the curvature of the lateral surfaces as in conventional lenses. The said grin lens 1001 is preferable to a conventional lens because it can be placed immediately after the said fibres 11, 12, 13 and 14 of the said array 1000, thus enabling gathering of all the said signals 111, 112, 113 and 114 output from the said array 1000 before the said signals diverge excessively.

In the embodiment shown in FIG. 2, a convex lens 1010 having a focus of approximately 80 mm is placed approximately 8 cm away from the said grin lens 1001 to correct divergence of the said four signals 111, 112, 113 and 114 output from the said grin lens 1001. The said four signals 111, 112, 113 and 114 input into the said grin lens 1001 are, in fact, offset in relation to the axis of the said grin lens 1001 and consequently when output from the same possess optimum collimation but considerable divergence.

According to a variant, the means of collimation 5 as previously described can be created using a set of microlenses, one for each of the said four digital optical signals 1, 2, 3 and 4, as described below referring to FIG. 10.

At output from the said means of collimation 5, the said four signals 111, 112, 113 and 114 are essentially well collimated and parallel over the entire section in free space. In particular, the two extreme outside signals 111 and 114 are separated by approximately 3.8 mm.

Figure 3:
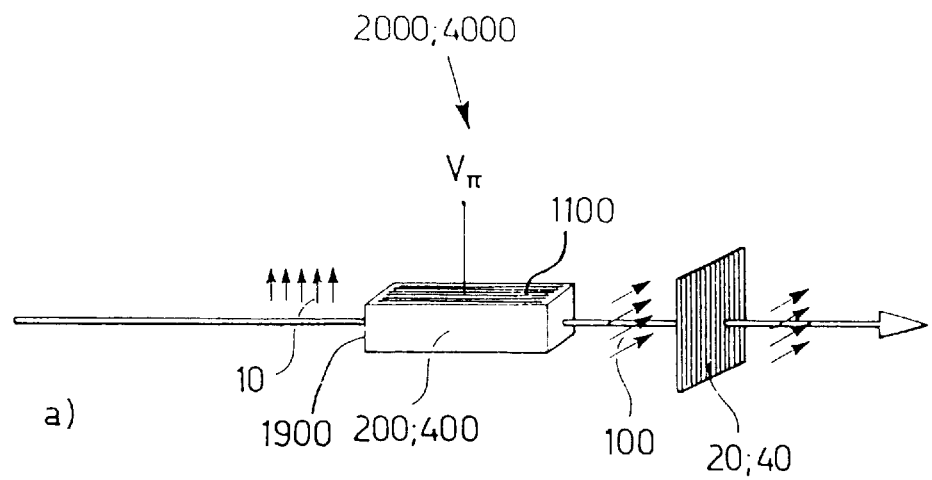
FIG. 3 shows the operation of an optical switching module of the device illustrated in FIG. 1.
Figure 3:
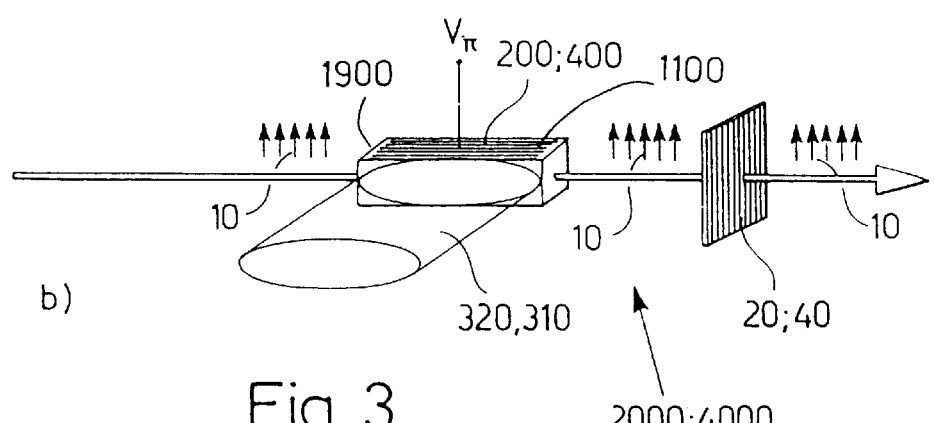

As shown in FIG. 3, the said first switching module 2000 preferably consists of a first indium-doped cadmium tellurium (CdTe:In) monocrystal 200 and a first polarization analyzer 20.

The said first monocrystal 200, having dimensions of approximately 5×5×15 mm, is placed in a plexiglass mounting provided with openings corresponding to the input and output faces of the said signals 111, 112, 113 and 114 and equipped internally with electrodes for application of voltage.

In this embodiment the signal is propagated perpendicular to the electrical field applied.

The said first polarization analyzer 20 preferably consists of a polarization divider cube.

The state of polarization, represented in FIG. 3 by the arrows 10, of the said optical signals 111, 112, 113 and 114 input into the said first module 2000 is adjusted, as stated above, by the said means 101, 102, 103 and 104 capable of controlling and if necessary changing the state of polarization. This adjustment is carried out in such a way that the said optical signals 111, 112, 113 and 114 are polarized in linear form at 45° in relation to the axes of birifringence induced in the said first monocrystal 200. The said birifringence is induced by applying a voltage to the said first monocrystal 200 capable of rotating, by electro-optical effect, the plane of polarization 10 of the said signals 111, 112, 113 and 114 through an angle of 90° so that the plane of polarization orthogonal to the input plane 10 is obtained as represented by the arrows 100.

In FIG. 3a, the said first polarization analyzer 20 is oriented so as to block the said signals 111, 112, 113 and 114 output from the said first monocrystal 200. In this condition (OFF condition) the said first module 2000 is closed and does not allow transmission of the said signals 111, 112, 113 and 114.

By illuminating the first monocrystal 200 with a first optical control beam 320 at 1064 nm (the wavelength at which the CdTe:In shows a photoconductivity peak), the counterfield generated by the photogenerated carriers inhibits the electro-optical effect. Consequently, in the said first monocrystal 200 the plane of polarization 10 of the said signals 111, 112, 113 and 114 is no longer rotated and the said analyzer 20 allows the said signals to pass through as shown in FIG. 3b (ON condition).

The said first monocrystal 200 is characterised by two response times:

a time $t_{on}$ relating to the process of photogeneration of the carriers and creation of the counterfield, and a time $t_{off}$ relating, on the other hand, to the process of re-combination of such charges and restoration of the initial conditions.

Experiments have demonstrated that the time $t_{on}$ is very fast (typically a few ns) and tends to follow exactly the rise time of the said first optical control pulse 320 when these possess a sufficiently high power density (approximately $10^5$ W/cm2 higher). Time $t_{off}$ on the other hand is considerably slower (typically a few $\mu s$) and is strictly correlated to the spatial distribution of the said first optical control beam 320. Consequently, only with the said first monocrystal 200 is it not possible to create a device having a response speed of the order of nanoseconds.

An important characteristic of the said first monocrystal 200 is the fact that it is essentially transparent (possesses an absorption coefficient approximately lower than 0.2 cm$^{-1}$) to wavelengths above approximately 1250 nm. The optical device according to the invention can therefore be used in optical communication systems in second and third window.

The description and the comments made concerning this first optical switching module 2000 also apply for the said second switching module 4000, consisting of a second monocrystal 400 and a second polarization analyzer 40.

Figure 4:
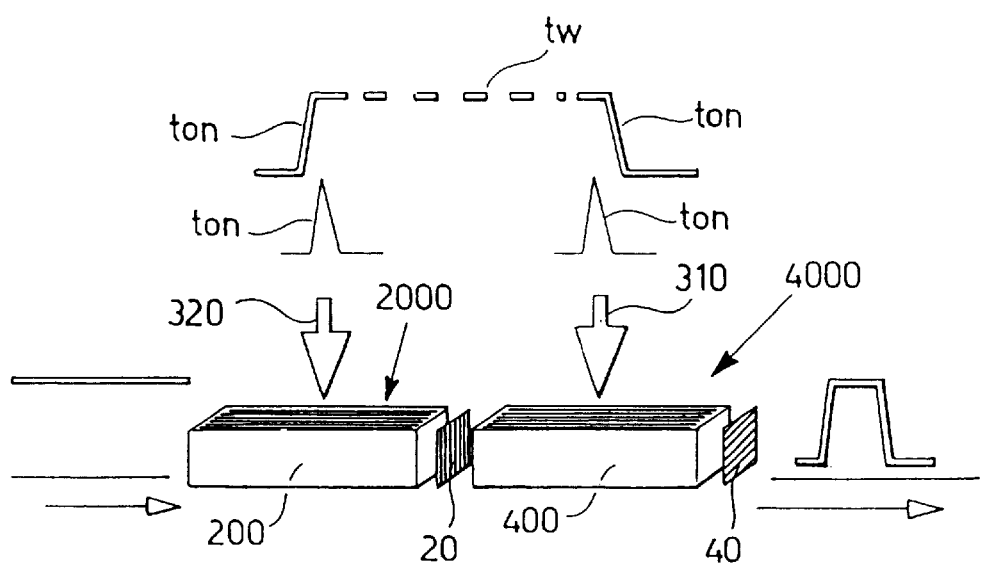
FIG. 4 shows the mode of operation of two optical switching modules of the device illustrated in FIG. 1.

As shown in FIG. 4, the said first and second switching modules 2000 and 4000 are arranged in series, with the respective polarization analyzers 20 and 40 cross-oriented, and they are controlled by a first and a second beam of optical control pulses 320 and 340 delayed in relation to each other by a predetermined time.

Initially the plane of polarization of the said signals 111, 112, 113 and 114 input to the said first monocrystal 200 is rotated by electro-optical effect and, when output from the latter, the said signals 111, 112, 113 and 114 are blocked by the said first polarization analyzer 20 (1st module in OFF condition). On arrival of the said first optical control pulse 320 the electro-optical effect of the said first monocrystal 200 is inhibited (1st module in ON condition). The said signals 111, 112, 113 and 114 can therefore pass through the said first polarization analyzer 20 and enter the said second monocrystal 400, where their plane of polarization undergoes a 90° rotation due to an electro-optical effect. Because the said second polarization analyzer 40 is oriented perpendicular in relation to polarization analyzer 20 of the said first module 2000, the OFF condition of the second module 4000 enables the said signals 111, 112, 113 and 114 to be transmitted with a response time equivalent to $t_{on}$ and to leave the said modules 2000 and 4000. The said optical switching modules would stay in these conditions, i.e. open, for the entire extinguished time $t_{off}$ of the said first monocrystal 200.

To obtain a total opening time of the said first and second modules 2000 and 4000 in series of less than $t_{off}$, suitable guiding means 30 lead the said second control pulse 310 to the said second monocrystal 400 after a predetermined time interval of $t_w$ less than $t_{off}$. The second module 4000 is then activated (2nd module in ON condition), the said signals 111, 112, 113 and 114 no longer undergo rotation of the said plane of polarization and are thus cut off by the said second analyzer 40, with a response time of $t_{on}$.

The total opening time of the said first and second modules 2000 and 4000 in series can be adjusted by selecting the delay $t_w$ between the said first and second optical control pulse 320 and 310. This delay $t_w$ must not be greater than the extinction time $t_{off}$ typical of the said monocrystals 200 and 400. It must furthermore not be less than $t_{on}$ to enable the said first monocrystal 200 to respond to the said first control pulse 320.

Figure 5:
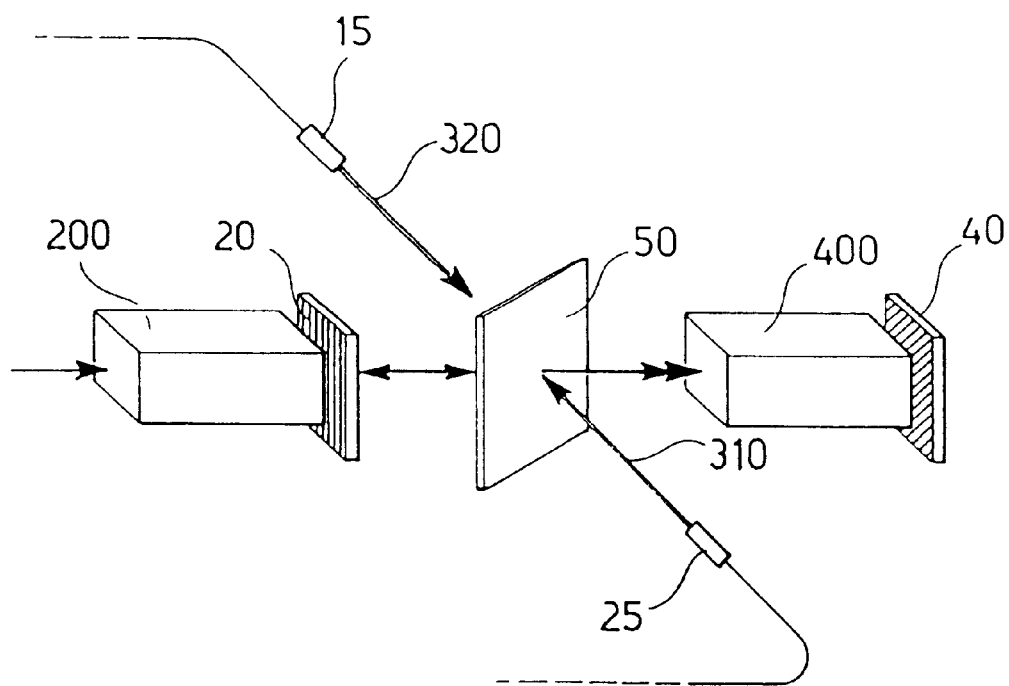
FIG. 5 shows the mode of operation of a dichroic mirror interposed between two elementary modules of the device illustrated in FIG. 1.

In FIGS. 3 and 4, the case in which illumination of the said monocrystals 200 and 400 by the said optical control beams 320 and 310 is crosswise to the direction of propagation of the said signals 111, 112, 113 and 114 is illustrated, whilst FIG. 5 represents the case in which the said first and second optical control beams 320 and 310 arrive in the said monocrystals 200 and 400 in collinear fashion in relation to the said signals 111, 112, 113 and 114.

As shown in FIG. 5, a dichroic mirror 50 is placed between the said first and second modules 2000 and 4000; the said mirror is transparent to the wavelength of the said signals 111, 112, 113 and 114 and reflects the wavelength of the said first and second optical control beam 320 and 310. Typically, the wavelength of the said signals 111, 112, 113 and 114 is approximately 1550 nm and that of the said first and second optical control beams is approximately 1064 nm.

In the case, not illustrated, in which the wavelength of the said digital optical signals 111, 112, 113 and 114 is essentially the same as that of the said first and second optical control beams 320 and 310, the said dichroic mirror 5 can be substituted, e.g. by a beam splitter capable of transmitting approximately half the power of the said digital optical signals 111, 112, 113 and 114 and of the said first and second optical control beams 320 and 310 and reflecting approximately the other half of the same.

The said dichroic mirror 50 is essentially inclined at an angle of 45° in relation to the propagation direction of both the said 111, 112, 113 and 114 and the said first and second optical control beams 320 and 310 (FIG. 5). The said first control beam 320, coming from a direction essentially perpendicular to that of the said signals 111, 112, 113 and 114, after reflection on the said dichroic mirror 50 is incident upon the said first monocrystal 200 in a direction collinear to, but opposite to, that of the said signals 111, 112, 113 and 114 (counterpropagating illumination).

In turn, the said second control beam 310, also coming from a direction essentially perpendicular to that of the said signals, 1, 2, 3 and 4, after reflection on the said dichroic mirror 50, is incident upon the said second monocrystal 400 in a direction which is collinear to, and is the same direction as, the said signals 111, 112, 113 and 114 (copropagating illumination).

Both illumination modes, counterpropagating and co-propagating, are equally effective for the purposes of achieving switching.

As shown in FIG. 6, the said first and second optical pulse control beams 320 and 310 having wavelength of approximately 1064 nm are preferably generated by Nd:YAG Q-switched laser 300. The FWHM duration of the said pulses is approximately 5 ns. The optical control beam 3000 output from the said laser is divided into two equal parts by means of a beam splitter 33 and coupled to a first 32 and a second 31 multimode optical power fibre of which the core diameter is approximately 600 $\mu$m. The lengths of the said first and second optical fibres 32 and 31 are different from each other in such a way that the said first and second optical pulses 320 and 310 are incident upon the said first 200 and, respectively the said second 400 monocrystals at different time instants. The delay $t_w$ between the said first and second optical control pulses 320 and 310 determines, as described above, the total opening time of the said first and second optical series switching modules 2000 and 4000.

In this case, the said total opening time will be equal to the bit time, whilst the interval between two successive selections will be equal to the duration of the bit series which is being converted, this, in the example given in FIG. 6, being four times the bit time.

Two flat-to-convex lenses 15 and 25 with 30 mm focus collimate the said first and second optical control beams 320 and 310 output from the said first and second optical fibres 32 and 31 so that the diameter of the beams (spots) incident upon the said monocrystals 200 and 400 is approximately 7 mm. In this way the said first and second optical control beams 320 and 310 completely illuminate the input surface of the said monocrystals 200 and 400 which is approximately 5×5 mm. In addition, the said flat-to-convex lenses 15 and 25 guide the said first and second optical control beams 320 and 310 in free space in such a way that they are incident upon the said dichroic mirror 50 at an angle of approximately 45°.

In the embodiment illustrated, the energy of the said first and second optical control pulses 320 and 310 incident upon the said monocrystals 200 and 400 is approximately 1 mJ. With energy of this order, the time ton of the said monocrystals 200 and 400 is the same as the rise time (corresponding to the time taken by the pulse to increase from approximately 10% to approximately 90% of the maximum intensity value) of the said first and second control pulses (approximately 3 ns).

In the case of CdTe:In monocrystals, it has been observed in experiments that in order to cause the said first and second switching modules 2000 and 4000 to switch in series, the energy of the said first and second optical control pulses 320 and 310 only needs to be equivalent to or greater than 350 $\mu$J.

The four bits output from the first and second optical switching modules 2000 and 4000 which form the said spatial FIG. 7d are thus ready to undergo subsequent processing operations in parallel and in free space.

The said subsequent processing operations are carried out using means 7000, 71, 72, 73 and 74 to eliminate one bit of the said spatial FIG. 7d of four bits and means 81, 82, 83, 84, 80 and 8 to insert one bit into the said spatial FIG. 7d.

In particular, FIG. 1 illustrates an alternative in which the third bit is eliminated and the second bit is inserted.

The said means of eliminating the third bit of the said spatial FIG. 7d comprise a third optical switching module 7000, placed downstream of the said means of collimation 5 and upstream of the said first and second switching modules 2000 and 4000, and means (not illustrated) of supplying the third, 73, of four optical elimination signals 71, 72, 73 and 74.

The descriptions and comments made concerning the said first optical switching module 2000 also apply to the said third switching module 7000, which consists of a third indium-doped cadmium tellurium (CdTe:In) monocrystal 700 and a third polarization analyzer 70.

In the embodiment as shown in FIG. 1, the said third polarization analyzer 70 is oriented so as to allow the said optical signals 111, 112, 113 and 114 output from the said third monocrystal 700 to pass through when the said elimination signals 71, 72, 73 and 74 are absent (3rd module: OFF condition), and to block them when the said optical elimination signals 71, 72, 73 and 74 illuminate the said third monocrystal 700 (3rd module: ON condition).

The said third digital optical signal 113, relative to the said third bit to be eliminated, is thus blocked, illuminating the region of the said third monocrystal 700 where the said third digital optical signal 113 is propagated by means of the said third optical elimination signal 73.

In the case illustrated of a CdTe:In monocrystal and a power density of the said elimination signals 71, 72, 73 and 74 of less than approximately 0.5 mW/mm$^2$, it has been found that when the said elimination signals 71, 72, and 74 are situated more than approximately 0.5 mm away from the said third digital optical signal 113, elimination of the said third bit of the said spatial FIG. 7d does not interfere with propagation of the other digital optical signals 111, 112 and 114 corresponding to the other bits of the said spatial FIG. 7d.

The dimensions of the said third monocrystal 700, i.e. 5×5×15 mm, are such that they can fully contain the said optical signals 111, 112, 113 and 114, with a gap of at least 0.5 mm between each other.

The said third optical elimination signal 73 has a wavelength of approximately 1064 nm and is generated by a laser (not illustrated) made of neodymium-doped fibre and pumped by an approximately 810 nm laser diode which emits a continuous signal.

In a preferred embodiment, four on/off switches (not shown) select the said four optical elimination signals 71, 72, 73 and 74 dependent on the bit(s) to be eliminated in the said spatial FIG. 7d. The said on/off switches can be controlled either electrically, for example, by using a common integrated electrical-optical modulator, or optically, for example, by using an optical switching module similar to those described above.

The said elimination signals 71, 72, 73 and 74 and the said signals 111, 112, 113 and 114 relative to the said four bits of the said spatial FIG. 7d are coupled in fibre, before the said means 5 of collimation previously described, by means of four 2×2 fusion couplers to combine a first signal at about 1550 nm with a second signal at about 1064 nm.

Because the said elimination signals 71, 72, 73 and 74 are output, respectively, from the same fibres 11, 12, 13 and 14 as the said digital optical signals 111, 112, 113 and 114 and are subjected to the same collimation process, they are perfectly aligned with and overlap the said digital optical signals 111, 112, 113 and 114.

In the embodiment shown in FIG. 1, in which the said elimination signals 71, 72, 73 and 74 and the said digital optical signals 111, 112, 113 and 114 are coupled in guided propagation before the said means of collimation 5, the said third switching module 7000 is arranged, as previously mentioned, downstream of the said means of collimation 5 and upstream of the said first and second switching modules 2000 and 4000.

In another embodiment, in which the coupling between the said elimination signals 71, 72, 73 and 74 and the said digital optical signals 111, 112, 113 and 114 is carried out in a different way, for example in free space, the said third switching module 7000 can also be placed downstream of the said first and second switching modules 2000 and 4000, it being possible at this point to insert the said elimination signals 71, 72, 73 and 74 at any given point of the section in free space. The two solutions are completely equivalent.

Downstream of the said third module 700 and upstream of the said first module 2000, an interference filter (not shown) is located; the said filter is transparent to the wavelength of approximately 1550 nm of the said digital optical signals 111, 112, 113 and 114 and reflects the wavelength of approximately 1064 nm of the said elimination signals 71, 72, 73 and 74. The said interference filter thus prevents the said elimination signals 71, 72, 73 and 74 relative to the said third switching module 7000 and the said counterpropagating first optical control beam 320, relative to the said first switching module 2000, from reaching the modules which do not concern them.

Using the optical device illustrated in FIG. 1, an experimental operation was carried out to eliminate the second bit of a temporal series "1111" of bits, in RZ format and at approximately 140 Mbit/s, input into the device. In FIG. 11, the recordings of the temporal series "1111" input (FIG. 11a) into and the modified "1011" series (FIG. 11b) output from the device, obtained by means of suitable photodetectors and an oscilloscope with passband of approximately 1 GHz, are reported.

The said means of inserting the second bit in the said spatial FIG. 7d comprise means (not shown) of supplying the second, 82, of four insertion optical signals 81, 82, 83 and 84, means 80 of collimation of the said insertion signals 81, 82, 83 and 84 and a beam splitter 8.

The said means of supplying the second, 82, of four optical insertion signals 81, 82, 83 and 84 comprise, preferably, a laser diode DFB (not shown) which supplies a continuous signal having a wavelength of approximately 1550 nm and an output power into fibre of approximately 1 mW.

For example, the said means 80 of collimation of the said insertion signals 81, 82, 83 and 84 comprise a grin lens to collimate the said signals 81, 82, 83 and 84 in free space and guide them in such a way that they are incident upon the said beam splitter 8 at an angle of approximately 45° and are then propagated in the spatial position relative to the respective said digital optical signals 111, 112, 113 and 114, in other words they overlap one of the said digital optical signals 111, 112, 113 and 114.

The said beam splitter 8 is capable of transmitting approximately half the power of the said digital optical signals 111, 112, 113 and 114 and of the said insertion signals 81, 82, 83 and 84 and reflecting approximately the other half of the said signals.

The said beam splitter 8, placed downstream of the said third switching module 7000 and upstream of the said second switching module 2000, is essentially inclined 45° in relation to the direction of the said digital optical signals 111, 112, 113 and 114 and to that of the said insertion signals 81, 82, 83 and 84, the direction of the said digital optical signals 111, 112, 113 and 114 being essentially orthogonal to the direction of the said insertion signals 81, 82, 83 and 84.

Means (not shown) such as, for example, a pair of polarization rotators as described earlier, placed upstream of the said means 8 of collimation, control and, if necessary, change the state of polarization of the said second insertion signal 82 in such a way that it is polarized in linear form at 45° in relation to the axis of induced birefringence, in the said first and second switching modules 2000 and 4000, by the said voltage applied to the same.

In the embodiment according to FIG. 1, asynchronous insertion of the said second bit into the said spatial FIG. 7d takes place at the moment when the said first and second switching modules 2000 and 4000 in series select, in parallel and in free space, a predetermined bit from each of the said four digital optical signals 111, 112, 113 and 114 and consequently at the moment when they convert the said temporal series 7a of four bits to the said spatial FIG. 7d. Consequently, the synchronism of the said insertion is guaranteed by the synchronism of the said first and second switching modules 2000 and 4000 in series in relation to the said four digital optical signals 111, 112, 113 and 114.

According to another embodiment, insertion of the said second bit can be carried out by inserting the said bit into the correct spatial position in synchronism with all the said digital optical signals 111, 112, 113 and 114 constituting the said spatial FIG. 7d of four bits. In comparison with this latter embodiment, however, the embodiment illustrated in FIG. 1 does not require any timing between the said digital optical signals 111, 112, 113, 114 and the said bit to be inserted. Furthermore, the embodiment shown in FIG. 1 is far simpler to make, since, for insertion of the said bit, it is possible to use the same first and second switching modules 2000 and 4000 in series which convert the said four bit temporal series 7a into the said spatial FIG. 7d of four bits.

The temporal duration of the said second inserted bit will be equal to the total opening time of the said first and second switching modules 2000 and 4000. The said duration will, preferably, be equal to or less than the bit time in order to prevent partial overlapping of the said four bits (intersymbolic interference) in a subsequent conversion of the said spatial FIG. 7d to a temporal series 7e of four bits of a processed digital optical signal 900 output from the device.

Preferably the said means of insertion of the second bit also comprise a system of four on/off switches (not shown) capable of blocking or transmitting the said optical insertion signals 81, 82, 83 and 84 depending on the bit(s) to be inserted into the said spatial FIG. 7d. The said on-off switches can be controlled either electrically, for example by using a common integrated electrical-optical modulator, or optically by using an optical switching device similar to those previously illustrated.

By means of the optical device illustrated in FIG. 1, an experimental operation has been carried out for asynchronous insertion of the third bit in a temporal series "1101" of bits, in RZ format and at approximately 140 Mbit/s, input into the device. In FIG. 12, the recordings of the temporal series "1101" input into (FIG. 12a) and the modified temporal series "1111" (FIG. 12b) output from the device, obtained by means of suitable photodetectors and an oscilloscope with passband of approximately 1 GHz, are reported.

In the case under consideration, the third inserted bit was found to be lower and wider than the other bits. Its narrower amplitude is due to the fact that insertion of the third bit was carried out by a continuous laser signal having, after the beam splitter 8, lower power (approximately 1 mW) than the power of the digital optical signals output from the optical amplifier, which had, after the beam splitter 8, a power of approximately 1.5 mW each, and also to inadequate alignment of the third optical insertion signal with the spatial position relative to the third bit. The greater width of the third inserted bit in comparison with the others is, on the other hand, due to the fact that, the said optical control beams 320 and 310 having a rise time of approximately 3 ns, the total opening time of the said first and second optical switching modules 2000 and 4000, was greater than the physical duration of the bits in RZ format at approximately 140 Mbit/s.

These flaws can nevertheless obviously be corrected by using a continuous 1.5 mW laser signal, correctly aligning the optical insertion signal with the spatial position relative to the third bit and using control beams with a rise time such that the total opening time of the said first and second optical switching modules 2000 and 4000 is equal to the physical duration of the bit.

The embodiment illustrated in FIG. 1 can also comprise means of changing the form of the said four bits of the said spatial FIG. 7d.

The said means convert the said "Non Return to Zero" (NRZ) coded bits of the said spatial FIG. 7d to "Return to Zero" (RZ) coded bits.

According to a preferred embodiment, the said means halve the ratio (duty cycle) between the physical duration of the said digital optical signals 111, 112, 113 and 114, corresponding to 1 bit, and the bit time. In this way, since in the NRZ format the said ratio is approximately 1, the said means enable a ratio of approximately 0.5 to be obtained.

The said halving is carried out by adjusting the total opening time of the said first and second optical switching modules 2000 and 4000 in series so that they stay open for a time equal to approximately half the bit time.

By adjusting the said total opening time in this way, the said first and second optical switching modules 2000 and 4000 are capable of carrying out both the said transformation of the said four bit temporal series 7a into the said spatial FIG. 7d and modification of the duty cycle of the said bits of the said spatial FIG. 7d.

Determination of total opening time has to be carried out very carefully because this determines the form the selected bit shall take. This being so, it is necessary to consider the total response time during opening and closing of the said first and second switching modules 2000 and 4000 in series, i.e. $t_{on}$, which, as stated above, is the same as the rise time of the said first and second optical control pulses 320 and 310 (approximately 3 ns in the embodiment illustrated).

The said first and second switching modules 2000 and 4000 of the embodiment illustrated in FIG. 1 cannot, therefore, stay open for a total time of less than approximately 6 ns.

The said conversion is therefore feasible, for example, in the case of a temporal series 7a with a bit rate of 70 Mbit/s (corresponding to a bit time of approximately 14.28 ns) which, therefore, needs a total opening time of the said first and second switching modules 2000 and 4000 in series of approximately 7.14 ns.

The said total opening time is adjusted by changing the lengths of the said first and second optical fibres 32 and 31 to take into account the total response time $t_{on}$ during opening and closing of the said first and second switching modules 2000 and 4000 in series.

For example, in the case described above of a bit rate of 70 Mbits, in order to obtain a total opening time of the said first and second switching modules 2000 and 4000 of approximately 7.14 ns, the lengths of the said first and second optical fibres 32 and 31 are selected so that the said first and second optical control pulses 320 and 321 are incident upon the said first and respectively the said second modules 2000 and 4000 with a delay of approximately 4 ns. This delay is obtained by lengthening the said second optical fibre 31 by approximately 80 cm in relation to the said first optical fibre 32.

In such a case, the operation of conversion of a temporal series of four bits "1111" input into the device, at approximately 70 Mbit/s and NRZ coded, into four corresponding RZ coded bits with a duty cycle of approximately 0.5 was carried out in an experiment. In FIG. 13 the recordings are reported of the input temporal series "1111" (FIG. 13a), NRZ coded, and the corresponding temporal series (FIG. 13b) output from the device, RZ coded, obtained by means of suitable photodetectors and an oscilloscope with passband of approximately 1 GHz.

The device illustrated in FIG. 1 enables the same optical switching modules 2000 and 4000 to be used both for transforming the said temporal series of bits 7a into the said spatial FIG. 7d, and for inserting the said second bit and also for modifying the form of the said bits of the said spatial FIG. 7d. This therefore enables creation of a device with extremely simple and compact architecture benefiting from all the capacities of the parallel optical structures in free space.

As illustrated in FIG. 1, means of output transform the said four bit spatial FIG. 7d, processed if necessary, into a temporal series 7e of a processed digital optical output signal 900.

The said means of output comprise optical means 9 of focusing the said four bits, in free space, in four optical fibre lines (sections) 910, 920, 930 and 940 and a coupler 90 to convey the said bits output from the said lines 910, 920, 930 and 940 to the said processed digital optical output signal 900.

As illustrated in FIG. 2, the said optical means 9 of focusing the said four bits of the said spatial figure have, preferably, a symmetrical structure in relation to the said means of collimation 5. The said means 9 comprise a first lens 9010, with focus of approximately 80 mm, for focusing the said digital optical signals 111, 112, 113 and 114 in free space, corresponding to the said four bits, output from the said first and second optical switching modules 2000 and 40900, on the input surface of a grin lens 9001, as previously described, located on the focal plane of the said lens 9010.

Emergent from the said grin lens 9001, the said digital optical signals 111, 112, 113 and 114 are highly focused and are thus easily guided in guided propagation by means of an array 9000 of the said four optical fibre lines 910, 920, 930 and 940 arranged in a linear geometry similar to that previously described for the said means of collimation 5.

This linear geometry can easily be reproduced with an extremely high degree of accuracy. The precision with which the said arrays 1000 and 9000 of fibres have to be created depends on the diameter of the core of the monomode fibres, which at approximately 1500 nm is approximately 9 μm. Consequently, if one of the fibres 910, 920, 930 and 940 of the output array 9000 is offset in relation to the corresponding fibre 11, 12, 13 or 14 in the input array 1000 by a quantity greater than the said dimension, the bit which is propagated in the said fibre is badly coupled and consequently the information relative to one of the bits can be lost.

The precision of the linear geometry as shown in FIG. 2 is solely due to the external diameter of the cladding of the 1550 nm monomode fibres, which is approximately 125 µm with tolerances of less than approximately 1 µm. This guarantees optimum coupling in fibre of the said digital optical signals 111, 112, 113 and 114.

Figure 10:
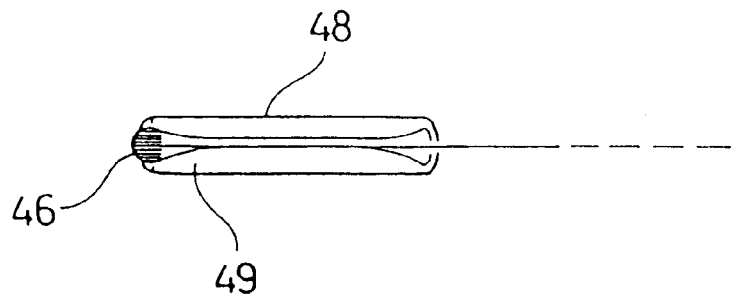
FIG. 10 shows an embodiment of means of collimation for eight digital optical signals of an optical device according to the invention.
Figure 10:
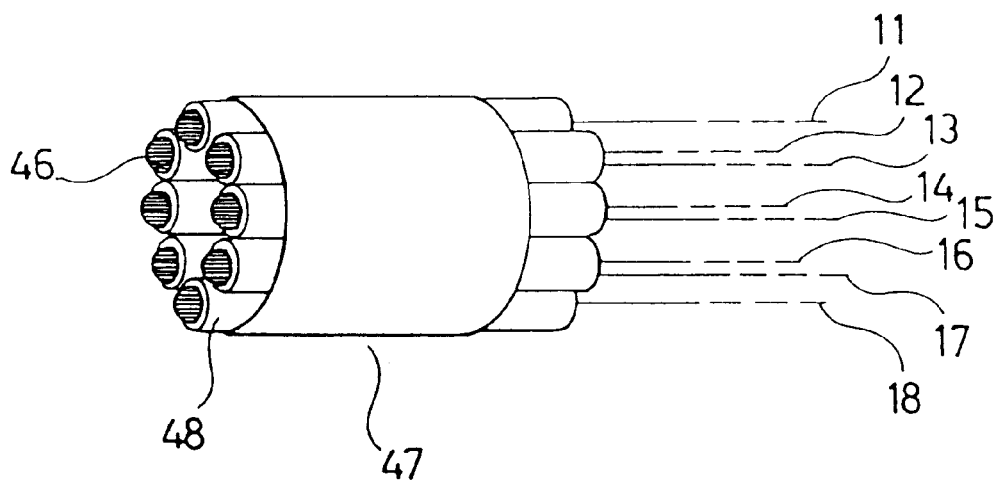

According to a variant, the said four optical fibres 11, 12, 13 and 14 input into and fibres 910, 920, 920 and 940 output from the device can be arranged in a two-dimensional geometry similar to that illustrated in FIG. 10 in the case of eight digital optical signals.

The said four optical fibre lines 910, 920, 930 and 940 in different lengths delay, in relation to each other, the said four bits of the said spatial FIG. 7d by a multiple time quantity of the bit time which, at approximately 140 Mbit/s, is approximately 7.12 ns. That is, the lengths of the said lines 910, 920, 930 and 940 differ from each others by multiple quantities of approximately 1.428 m, the necessary length to operate a delay of approximately 7.12 ns.

To construct the said four bit output temporal series, if necessary processed in relation to the said temporal series 7a input into the device according to the invention, the said four bits are inversely delayed in relation to the input bits. For example, the first bit, which is delayed in input by three times the bit time, is not delayed in output, whilst the fourth bit, which is not delayed in input, is delayed in output by three times the bit time.

Consequently, the fibre section 910 from which the first bit is extracted is not lengthened, fibre section 920 corresponding to the second bit is lengthened by 1.428 m, fibre section 930 corresponding to the third bit is lengthened by 2.856 m and section corresponding to the fourth bit is lengthened by 4.284 m.

The said lines 910, 920, 930 and 940 are also wound onto a reel having sufficiently large diameter to avoid causing losses due to excessive curvature.

The said 4×1 coupler 90 conveys in a single optical fibre 990 the said four bits emergent from the said lines 910, 920, 930 and 940 so as to obtain the said digital optical output signal 900 comprising the said temporal series of bits 7e, possibly processed in relation to the said input temporal series 7a.

Preferably, upstream of the said grin lens 9001, a differential filter (not shown) is arranged which is transparent to the wavelength of approximately 1550 nm of the said digital optical signals 111, 112, 113 and 114, corresponding to the said four bits, and which reflects the wavelength of approximately 1064 nm of the said second co-propagating optical control beam 310. In this way the said filter prevents the said second optical control beam 310 from being coupled in fibre and overlapping the said four bits of the said spatial figure.

According to another embodiment, the said optical fibre lines 910, 920, 930 and 940 can also delay, in relation to each other, the said four digital optical signals 111, 112, 113 and 114 by multiple quantities of a time greater or lesser than the bit time so as to change the duration of the said four bits of the said spatial FIG. 7d and, consequently, the bit rate.

More particularly, the dimensions of the said lines 910, 920, 930 and 940 can be adjusted according to the new bit time required.

For example, to increase from a bit time of approximately 7.14 ns to a time of approximately 9.64 ns, pieces of optical fibre are added in multiples of 50 cm to the said lines 910, 920, 930 and 940, the dimensions of which are suitable for working at approximately 140 Mbit/s. Accordingly, line 940, corresponding to the fourth bit of the said temporal series 7e to be reconstructed, is lengthened by approximately 150 cm (50 cm×3) and is therefore increased from approximately 4.248 m to approximately 5.748 m, the line corresponding to the third bit is lengthened by approximately 100 cm and increased from approximately 2.856 m to approximately 3.856 m, the line corresponding to the second bit is lengthened by approximately 50 cm, increasing it from approximately 1.428 m to approximately 1.928 m, whilst the line corresponding to the first bit does not need any added delays.

The said temporal series 7e output from the device according to the invention has, in this case, a bit rate of approximately 103.7 Mbit/s (the inverse of the new bit time of approximately 9.64 ns), which is less than its bit rate at the time of input.

In such a case, an experimental operation was carried out to change the duration of the bit time from approximately 7.14 ns to approximately 9.64 ns in the case of a four bit temporal series "1111", in RZ format and with a duty cycle of approximately 0.5, during input into the device.

FIG. 14 shows the recordings for the temporal series input into the device (FIG. 14a) at approximately 140 Mbit/s, and for the corresponding (FIG. 14b) temporal series output from the device, at approximately 103.7 Mbit/s, the said recordings having been obtained by means of suitable photodetectors and an oscilloscope with passband of approximately 1 GHz. Although the duration of the bit time output from the device was changed, the physical duration of the bit remained unchanged and therefore the duty cycle of the bits output from the device was reduced (approximately 0.37).

Other experiments have demonstrated the possibility of varying the length of the said lines 910, 920, 930 and 940 continuously so as to be able to continuously change the bit rate of the said bits of the said spatial FIG. 7d.

This is feasible due to the elasticity of optical fibres, which can be lengthened, in elastic conditions, by at least approximately 4%.

By means of a device capable of lengthening the fibres, consisting, for example, of two rows of pulleys onto which 10 m of fibre are rolled and a stepper electric motor, fibre lines 910, 920, 930 and 940 can be lengthened by as much as approximately 40 cm, thus causing a maximum extra delay of approximately 2 ns between the said bits of the said spatial FIG. 7d. By using three devices of this type arranged in series in relation to the said lines 920, 930 and 940 (line 910 which corresponds to the first bit needs no extra delays), it is possible to lengthen the bit time of a four bit word by a quantity less than or equal to approximately $\frac{2}{3}$ ns (in this way the maximum delay corresponding to the fourth bit will be approximately 2 ns). This quantity is not very significant at low bit rates but becomes considerably so at high bit rates. In fact, in the case of a bit time of approximately 1 ns (equal to a bit rate of approximately 1 Gbit/s) it is possible with the said devices to continuously lengthen the bit time to approximately 1.67 ms (equal to a bit rate of approximately 600 Mbit/s).

Figure 8:
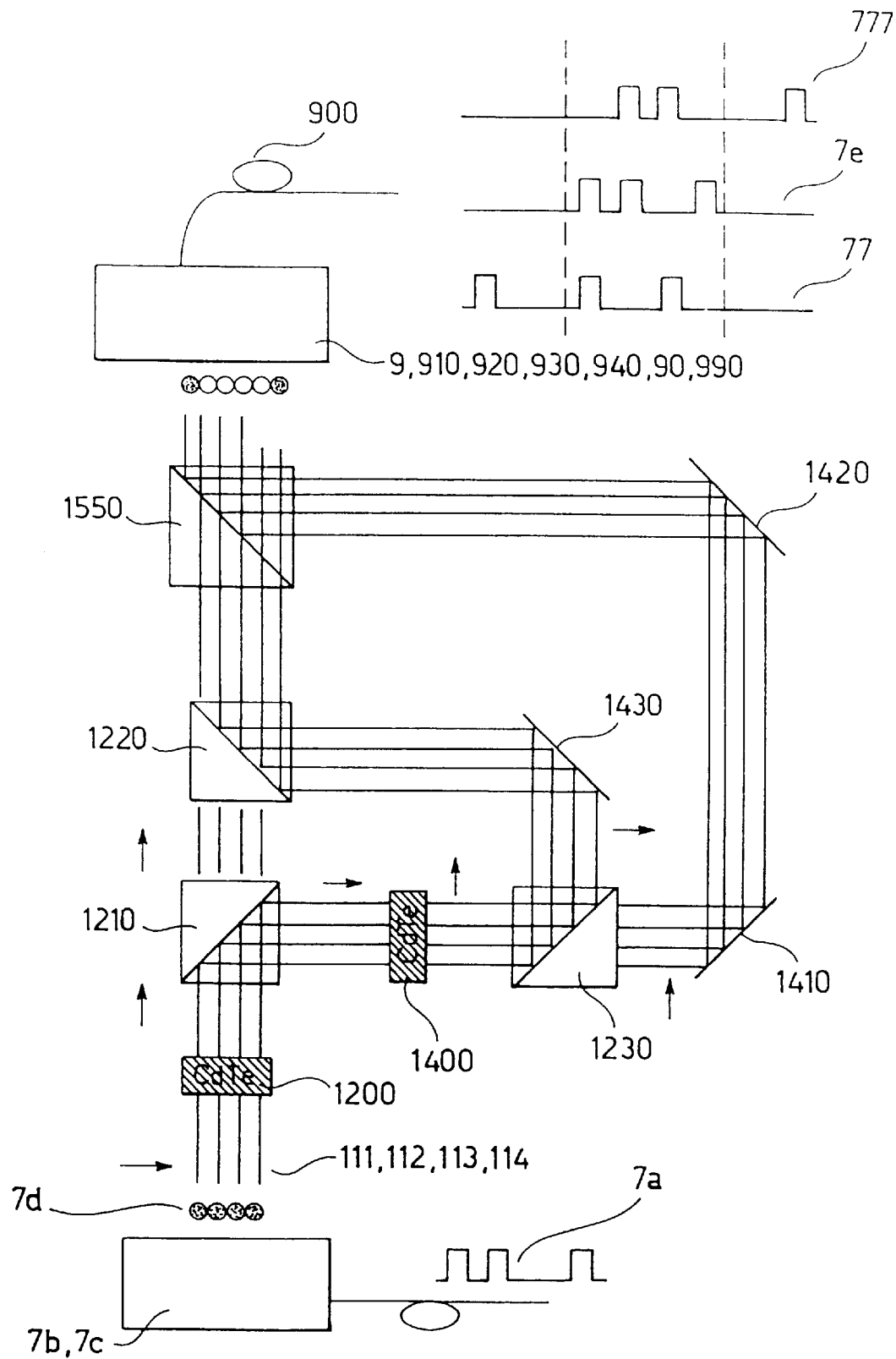
FIG. 8 shows an embodiment of means which are insertable in an optical device in accordance with the invention for execution of algebraic operations.

In a preferred embodiment, the device according to the invention also comprises means of execution of algebraic operations (FIG. 8).

In this case, for example, a fourth CdTe:In monocrystal 1200 is arranged in output from the said means (first and second switching modules 2000 and 4000) capable of transforming the said temporal series 7a of four bits into the said spatial FIG. 7d, the said CdTe:In monocrystal 1200 enabling actuation of algebraic operations by optically controlling the state of polarization, represented in FIG. 8 by an arrow, of the said four digital optical signals 111, 112, 113 and 114 corresponding to the said four bits of the said spatial FIG. 7d.

The description and comments made above concerning the aforesaid first monocrystal 200 also apply to the said fourth monocrystal 1200.

The said fourth monocrystal 1200, in fact, under the action of a continuous voltage $V_p$ and when a first optical beam enabling the said algebraic operations is absent, rotates the plane of polarization of the said four digital optical signals 111, 112, 113 and 114 by approximately 90° or leaves it unchanged when it is illuminated by the said first enabling beam.

A first polarization separator 1210 is arranged downstream of the said fourth monocrystal 1200. The said first polarization separator 1210 is oriented in such a way that it is transparent to the said four digital optical signals 111, 112, 113 and 114 when the said first optical beam enabling the said algebraic operations is absent and so that it deflects them in a direction essentially orthogonal to the direction of incidence when the said first enabling beam illuminates the said fourth monocrystal 1200.

In this way, as illustrated in FIG. 8, the said four digital optical signals 111, 112, 113 and 114 output from the said fourth monocrystal 1200 continue in their direction of propagation when the said optical enabling beam is absent, i.e. when no operation has to be executed. The said optical signals 111, 112, 113 and 114 are, on the other hand, deflected in a direction essentially orthogonal to the direction of propagation when the said first enabling beam illuminates the said fourth monocrystal 1200, i.e. when an algebraic operation has to be carried out.

A fifth CdTe:In monocrystal 1400 conveys the said optical signals 111, 112, 113 and 114 deflected by the said first polarization separator 1210 according to the operation to be carried out.

This fifth monocrystal 1400 too, in fact, under the action of a continuous voltage $V_p$, rotates the plane of polarization of the said four digital optical signals 111, 112, 113 and 114 by approximately 900 when a second optical beam enabling the said algebraic operations is absent and leaves it unchanged when it is illuminated by the said second enabling beam.

Downstream of the said fifth monocrystal 1400, a second polarization separator 1230 is arranged, oriented in such a way that it is transparent to the said four digital optical signals 111, 112, 113 and 114 when the said second enabling beam is absent, and such that it deflects them in a direction essentially orthogonal to the direction of incidence, when the said second enabling beam illuminates the said fifth monocrystal 1400.

In the embodiment according to FIG. 8, therefore, when the said second enabling beam is absent, a first and second mirror 1410 and 1420 reflect the said digital optical signals 111, 112, 113 and 114 output from the said second polarization separator 1230 and guide them onto a 50/50 beam splitter 1550, so as to translate the said spatial FIG. 7d of four bits to the left and thus execute the operation of multiplication by two, as represented by 77 in FIG. 8. When, on the other hand, the said second enabling beam illuminates the said fifth monocrystal 1400, a third mirror 1430 reflects the said digital optical signals 111, 112, 113 and 114 output from the said second polarization separator 1230 in order to guide them onto a third polarization separator 1220. The said third polarization separator 1220, in turn, guides the said digital optical signals 111, 112, 113 and 114 onto the said 50/50 beam splitter 1550 so as to translate the said four bit spatial FIG. 7d to the right and thus execute the operation of division by 2, as represented by 777 in FIG. 8.

After processing, the said spatial FIG. 7d is then re-converted in output into a temporal series 7e of bits of a processed digital optical signal 900, as previously described.

In another embodiment, the device according to the invention comprises means of execution of symmetry operations (FIG. 9) on a circular, eight bit spatial figure obtained, for example, by means 5, illustrated in FIG. 10, of collimation of eight digital optical signals output from eight optical fibres 11, 12, 13, 14, 15, 16, 17 and 18.

Of course, according to a variant not illustrated, the said symmetry operations can also be executed on a spatial figure of bits having a linear geometry similar to that, for example, illustrated in FIG. 2.

The said means of collimation 5 comprise a circular set 47 (FIG. 10b) of eight collimators 48 (FIG. 10a) in which the said circular set 47 has, for example, an external diameter of approximately 3.6 mm and each of the said collimators 48 has a diameter of approximately 1 mm.

At one end of each of the said collimators 48, a spherical collimation lens 46 is present, the diameter of which is approximately 600 $\mu$m. Coupling between each of the said eight optical fibres and each of the said spherical lenses 46 is preferably carried out by means of a glass microcapillary 49 with external diameter of 1 mm, internal hole 126 $\mu$m (1 $\mu$m larger than the diameter of the 1550 nm monomode fibre cladding) and two conical widened sections at the ends. The said two conical widened sections allow, at one end, assistance with insertion of one of the said eight fibres and, at the other end, housing and gluing-in of the said spherical lens 46 (FIG. 10a).

The focus of the said spherical lens 46 is preferably positioned on the surface of the said sphere in such a way that the said eight optical fibres can be inserted and glued in contact with the said spherical lens 46 with no need for special measurements to determine the best point for collimation.

The said eight collimators 48 thus created are then inserted in a circle between two metal tubes each having a predetermined diameter, one inside and the other outside the circular set 47, so as to obtain an essentially regular and symmetrical arrangement.

In this case, execution of the said symmetry operations is enabled by a sixth CdTe:In monocrystal 1300, placed downstream of suitable means (not illustrated) capable of transforming a temporal series of eight bits into a spatial figure.

Figure 9:
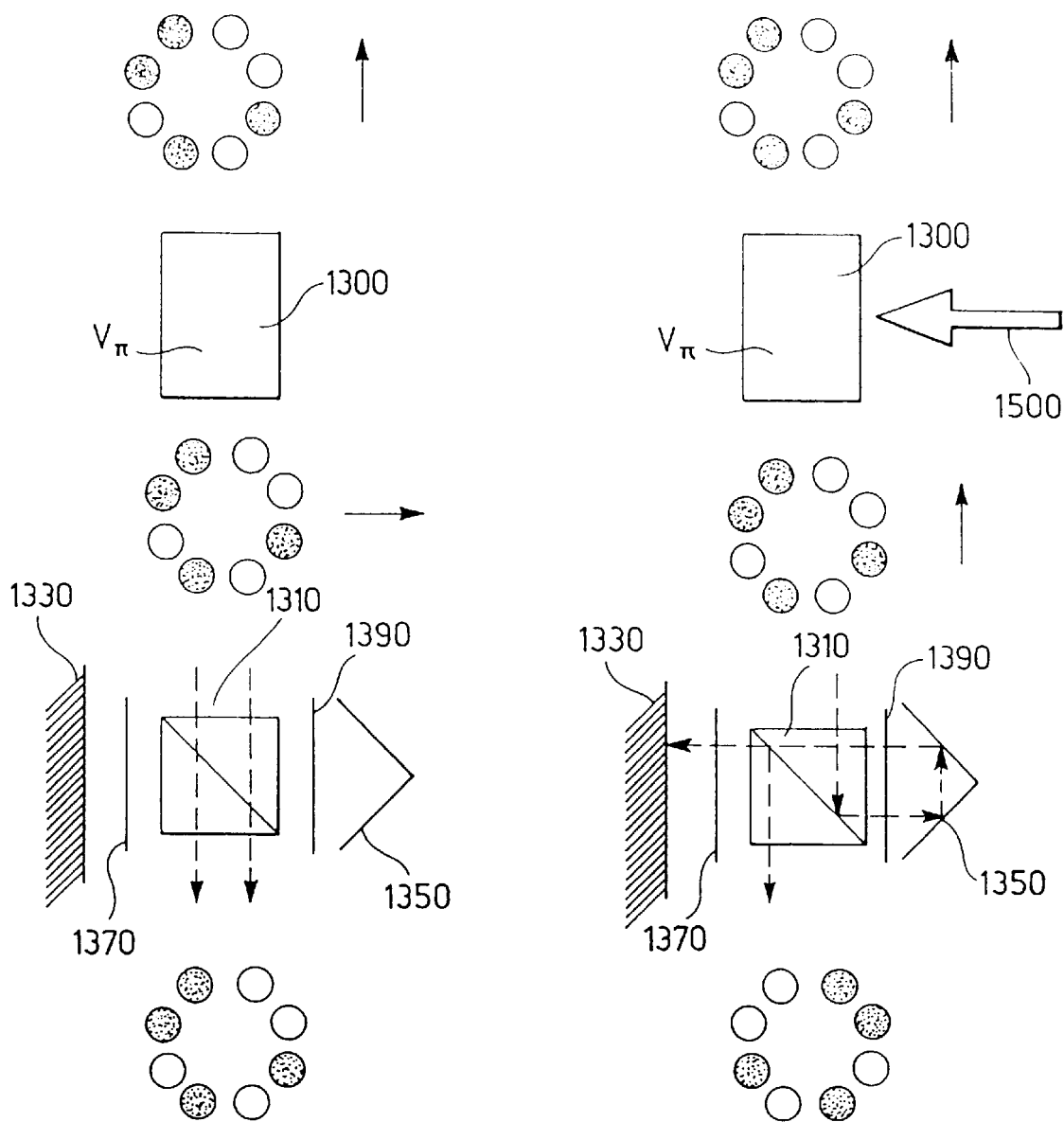
FIG. 9 shows an embodiment of means which are insertable in an optical device in accordance with the invention for execution of symmetry operations.

As illustrated in FIG. 9, the said sixth monocrystal 1300, under the action of a continuous voltage $V_m$, rotates by approximately 90° the plane of polarization (represented in FIG. 9 by an arrow) of the said eight digital optical signals (corresponding to the said eight bits), when an optical beam 1500 enabling the said symmetry operations is absent, and leaves it unchanged when it is illuminated by the said enabling beam 1500.

Downstream of the said sixth monocrystal 1300, a fourth polarization separator 1310 is located, oriented in such a way that it is transparent to the said eight digital optical signals when their plane of polarization is rotated approximately 90° by the said sixth monocrystal 1300, i.e. when the said beam 1500 enabling the said symmetry operations is absent. When, on the other hand, their plane of polarization is not rotated, i.e. when the said enabling beam 1500 illuminates the said sixth monocrystal 1300, the said fourth polarization separator 1310 deflects them in a direction essentially orthogonal to the direction of incidence.

In the absence, therefore, of the said beam 1500 enabling the said symmetry operations, the said eight signals continue unchanged. When, on the other hand, the said enabling beam 1500 illuminates the said sixth monocrystal 1300, a $\lambda/2$ plate 1390, a prism 1350, a $\lambda/4$ plate 1370, and a mirror 1330 process the said eight bit circular figure so as to execute required symmetry operations such as, for example, symmetry in relation to an axis of the bit configuration (FIG. 9).

What is claimed is:

1. An optical device for processing a digital optical signal in parallel and in free space, the device comprising:
   a) means for inputting a digital optical signal in guided propagation, the signal comprising at least one temporal series of n bits;
   b) means capable of converting the digital optical signal to n digital optical signals in guided propagation, each of the signals comprising the at least one temporal series of n bits;
   c) means capable of converting the n digital optical signals in guided propagation, each of the signals comprising the at least one temporal series of n bits, to n digital optical signals in free space;
   d) means capable of selecting, in parallel and in free space, a bit preselected from the at least one temporal series of n bits of each of the n digital optical signals, so as to transform the at least one temporal series of n bits into a spatial figure of the n bits which carries the same information as that previously contained in the at least one temporal series;
   e) optical means capable of modifying, in parallel and in free space, at least one bit of the spatial figure of the n bits, the optical means being selected from the group comprising means capable of eliminating at least one bit, means capable of inserting at least one bit, and means capable of modifying the form of at least one bit; and
   f) means for outputting the at least one bit of the spatial figure of n bits.

2. A device according to claim 1, wherein the means capable of selecting, in parallel and in free space, a bit preselected from the at least one temporal series of n bits of each of the n digital optical signals so as to transform the at least one temporal series of n bits into a spatial figure of the n bits which carries the same information as that previously contained in the at least one temporal series comprises:
   a) a first optical switching module;
   b) a second optical switching module arranged in series in relation to the first optical switching module;
   c) means of supplying to the first and, respectively, to the second optical switching module at least one pair of a first and a second beam of optical control pulses having a predetermined time interval between each other;
   d) a dichroic mirror capable of guiding the at least one pair of a first and a second beam of optical control pulses in collinear mode in relation to the direction of propagation of the n digital optical signals; and
   e) means of collimation for guiding in free space the at least one pair of a first and a second beam of optical control pulses in such a way that they are incident upon the dichroic mirror at a pre-established angle.

3. A device according to claim 2, wherein the first and second optical switching modules comprise a first monocrystal and a second monocrystal capable of causing the plane of polarization of the n digital optical signals in free space to rotate by a predetermined angle under the action of the at least one pair of a first and a second beam of optical control pulses, and also comprise a first and a second polarization analyzer respectively capable of filtering, along a predetermined plane of polarization, the n digital optical signals output from the first monocrystal and the second monocrystal.

4. A device according to claim 3, wherein the first and second elements consist of a first and a second indium-doped cadmium tellurium (CdTe:In) monocrystal.

5. A device according to claim 3 or claim 4, wherein the first and second polarization analyzers are oriented essentially orthogonal to each other.

6. A device according to claim 1, wherein the means of output comprise means of optical focusing capable of guiding the spatial figure of n bits in free space in means of guided propagation.

7. A device according to claim 1, wherein the means for outputting comprises n lines capable of intervaltiming the n bits of the spatial figure in predetermined time intervals.

8. A device according to claim 7, wherein the means for outputting comprises means capable of conveying the n bits, interval-timed and in guided propagation, to a processed digital optical signal comprising at least one temporal series of n bits.

9. A device according to claim 1, wherein the means of elimination of the at least one bit of the spatial figure of n bits comprises a third switching module and means of supplying at least one elimination optical signal.

10. A device according to claim 9, wherein the third switching module comprises an element capable of causing the plane of polarization of at least one of the n digital optical signals output from n interval timing lines and from means of collimation, to rotate by a predetermined angle, under the action of at least one optical elimination signal and in that it also comprises a polarization analyzer capable of filtering, along a predetermined plane of polarization, the n digital optical signals output from the element.

11. A device according to claim 10, wherein the element consists of an indium-doped cadmium tellurium (CdTe:In) monocrystal.

12. A device according to claim 9, wherein the n digital optical signals are outputted from n interval-timing lines and the at least one optical elimination signal is collinear to and overlaps a single one of the n digital optical signals output from the n interval-timing lines.

13. A device according to claim 9, wherein the means of elimination of the at least one bit of the spatial figure of n bits also comprises, downstream of the third switching module, means transparent to the wavelength of the n digital optical signals and capable of reflecting the wavelength of the at least one optical elimination signal.

14. A device according to claim 1, wherein the means capable of inserting at least one bit into the spatial figure of n bits comprises means of supplying at least one optical insertion signal to first and second optical switching modules, the second optical switching module being arranged in series with the first optical switching module.

15. A device according to claim 14, wherein the at least one optical insertion signal has the same wavelength and power as the optical signals constituting the spatial figure of n bits.

16. A device according to claim 14 or claim 15, wherein the means of supplying at least one optical insertion signal also comprise the following means:
   transparent to half the power of the n digital optical signals and of the at least one optical insertion signal, and
   capable of reflecting the other half of power.

17. A device according to claim 16, wherein the transparent means comprises a 50/50 optical beam splitter.

18. A device according to claim 17, wherein the 50/50 optical beam splitter is essentially inclined at an angle of 45° in relation to the direction of the n digital optical signals and the direction of the at least one optical insertion signal, the direction of the n digital optical signals being essentially orthogonal to the direction of the at least one optical insertion signal.

19. A device according to claim 18, wherein the means of supplying the at least one optical insertion signal also comprises means capable of collimating in free space the at least one optical insertion signal so that they are incident at an angle of approximately 45° upon the 50/50 beam splitter and overlap one of the n digital optical signals.

20. A device according to claim 14, wherein the means of supplying at least one optical insertion signal also comprises means of controlling and, if necessary, varying their state of polarization.

21. A device according to claim 1, wherein the means capable of modifying the form of at least one bit of the spatial figure of n bits comprises means capable of varying a temporal interval between a first and second beam of optical control pulses.

22. A device according to claim 7, wherein the n lines interval-time at least one bit of the spatial figure of n bits by a time such that the at least one output bit is delayed in relation to the other bits of the spatial figure of n bits, by a quantity different from the bit time which the output bit had in input.

23. A device according to claim 1, wherein it further comprises means capable of executing algebraic operations on the spatial figure of n bits.

24. A device according to claim 1, wherein it further comprises means capable of executing symmetry operations on the spatial figure of n bits.

25. A device according to claim 23, wherein the means capable of executing the algebraic operations comprises at least one element capable of causing the plane of Polarization of the n bits of the spatial figure outputted from first and second optical switching modules to rotate by a predetermined angle, under the action of an optical laser enabling the algebraic operations, the second optical switching module being arranged in series with the first optical switching module.

26. A device according to claim 23 or claim 25, wherein the means capable of executing the operations also comprises at least one transparent means to one first predetermined plane of polarization of the n bits of the spatial figure, the transparent means also being capable of deflecting a second plane of polarization essentially orthogonal to the first plane.

27. A device according to claim 23, wherein the means capable of executing the algebraic operations also comprises at least one mirror capable of reflecting the n bits of the spatial figure.

28. A device according to claim 24, wherein the means capable of executing the symmetry operations comprises at least one element capable of causing the plane of polarization of the n bits of the spatial figure outputted from first and second optical switching modules to rotate by a predetermined angle under the action of an optical beam enabling the symmetry operations, the second optical switching module being arranged in series with the said first optical switching module.

29. A device according to claim 24, wherein the means capable of executing the symmetry operations also comprises at least one transparent means to one first predetermined plane of polarization of the n bits of the spatial figure, the transparent means also being capable of deflecting a second plane of polarization essentially orthogonal to the first plane.

30. A device according to claim 24, wherein the means capable of executing the symmetry operations also comprises means capable of reflecting the n bits of the spatial figure.

31. A device according to claim 24, wherein the means capable of executing the symmetry operations also comprises means capable of varying the state of polarization of the n bits of the spatial figure.

32. A method of processing a digital optical signal in parallel and in free space, comprising the steps of:
   a) feeding a digital optical signal comprising at least one temporal series of n bits;
   b) converting the digital optical signal to n digital optical signals in guided propagation, each of the signals comprising the at least one temporal series of n bits;
   c) converting the n digital optical signals in guided propagation, each of the signals comprising the at least one temporal series of n bits, to n digital optical signals in free space;
   d) selecting, in parallel and in free space, a predetermined bit from the at least one temporal series of n bits of each of the n digital optical signals, so as to transform the at least one temporal series of n bits into a spatial figure of the n bits which carries the same information as that previously contained in the at least one temporal series; and
   e) modifying in parallel and in free space at least one bit of the spatial figure of the n bits.

33. A device according to claim 32, wherein the step of modifying the spatial figure comprises eliminating at least one bit.

34. A method according to claim 32, wherein the step of modifying the spatial figure comprises inserting at least one bit.

35. A method according to claim 32, wherein the step of modifying the spatial figure comprises modifying the form of at least one bit.

36. A method according to claim 32, wherein the step of modifying the spatial figure comprises translating at least one bit from one position to another position in the spatial figure.

37. A method according to claim 32, wherein the spatial figure of n bits in free space thus modified is re-converted to at least one temporal series of n bits and guided in output.

38. A method according to claim 37, wherein the time duration of at least one bit of the temporal series of n bits guided in output is modified.

39. A device for modifying the time duration of at least one bit of a temporal series of n bits transformed into a corresponding spatial figure, characterised in that:
   the n bits of the spatial figure are guided in a beam of n optical guides at the end of which the n bits are further guided in a single optical guide in the form of a temporal series of n bits, and in that
   the beam of n optical guides comprises at least one section of optical guide having a length preselected such that, in being inputted to the single optical guide one bit which has traveled along the section is separated from at least one of the other bits of the series by a time interval different from that by which it was separated in the initial temporal series.

* * * * *